US012227006B2

(12) United States Patent
Hirano

(10) Patent No.: US 12,227,006 B2
(45) Date of Patent: Feb. 18, 2025

(54) LIQUID DISCHARGE APPARATUS AND HEAD DRIVE CONTROLLER

(71) Applicant: Hiromichi Hirano, Kanagawa (JP)

(72) Inventor: Hiromichi Hirano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 153 days.

(21) Appl. No.: 17/578,798

(22) Filed: Jan. 19, 2022

(65) Prior Publication Data

US 2022/0266593 A1 Aug. 25, 2022

(30) Foreign Application Priority Data

Feb. 24, 2021 (JP) ................................ 2021-027319

(51) Int. Cl.
*B41J 2/045* (2006.01)

(52) U.S. Cl.
CPC ......... *B41J 2/04588* (2013.01); *B41J 2/0455* (2013.01); *B41J 2/04581* (2013.01)

(58) Field of Classification Search
CPC .. B41J 2/04588; B41J 2/0455; B41J 2/04581; B41J 2/04593; B41J 2/04596; B41J 2/3556; B41J 2/0459; B41J 2/04591; B41J 2/04595; B41J 2/04598
See application file for complete search history.

(56) References Cited

U.S. PATENT DOCUMENTS

2021/0001629 A1* 1/2021 Yoshida .............. B41J 2/04516
2021/0162746 A1 6/2021 Araki

FOREIGN PATENT DOCUMENTS

JP 2010-115847 5/2010
JP 2021-084428 6/2021
WO WO2016/142645 A1 9/2016

* cited by examiner

*Primary Examiner* — Kristal Feggins
(74) *Attorney, Agent, or Firm* — Harness, Dickey & Pierce, P.L.C.

(57) ABSTRACT

A liquid discharge apparatus includes a head including a piezoelectric element and a nozzle, the head configured to drive the piezoelectric element to discharge a liquid from the nozzle, a drive waveform generator configured to generate a drive waveform to be applied to the piezoelectric element of the head, the drive waveform including a non-discharge pulse configured to drive the piezoelectric element to a degree at which the liquid is not discharged from the nozzle, and a discharge pulse applied to the piezoelectric element after the non-discharge pulse, the discharge pulse configured to drive the piezoelectric element to discharge the liquid from the nozzle, a switch between the head and the drive waveform generator, the switch configured to be switched to an ON-state in which the drive waveform passes the switch or to an OFF-state in which the drive waveform does not pass the switch.

9 Claims, 13 Drawing Sheets

COMPARATIVE EXAMPLE 1

LIQUID DISCHARGE APPARATUS AND HEAD DRIVE CONTROLLER

CROSS-REFERENCE TO RELATED APPLICATIONS

This patent application is based on and claims priority pursuant to 35 U.S.C. § 119(a) to Japanese Patent Application No. 2021-027319, filed on Feb. 24, 2021, in the Japan Patent Office, the entire disclosure of which is hereby incorporated by reference herein.

BACKGROUND

Technical Field

Aspect of the present disclosure relates to a liquid discharge apparatus and a head drive controller.

Related Art

In a liquid discharge head, a discharge speed and a discharge amount of liquid vary among the liquid discharge heads or nozzles due to, for example, variations in manufacturing the liquid discharge heads.

There is a technique to adjust a trimming range from an expansion waveform element for expanding a pressure chamber to a holding waveform element for holding an expanded state in a common drive waveform. The expansion waveform element is also referred to as a "falling waveform element".

SUMMARY

In an aspect of this disclosure, a liquid discharge apparatus includes a head including a piezoelectric element and a nozzle, the head configured to drive the piezoelectric element to discharge a liquid from the nozzle, a drive waveform generator configured to generate a drive waveform to be applied to the piezoelectric element of the head, the drive waveform including a non-discharge pulse configured to drive the piezoelectric element to a degree at which the liquid is not discharged from the nozzle, and a discharge pulse applied to the piezoelectric element after the non-discharge pulse, the discharge pulse configured to drive the piezoelectric element to discharge the liquid from the nozzle, a switch between the head and the drive waveform generator, the switch configured to be switched to an ON-state in which the drive waveform passes the switch or to an OFF-state in which the drive waveform does not pass the switch, and circuitry configured to control the switch to switch to the ON-state or the OFF-state in a waveform portion of the non-discharge pulse.

In another aspect of this disclosure, a liquid discharge apparatus includes a head including a piezoelectric element, a pressure chamber, and a nozzle, the head configured to drive the piezoelectric element to deform the pressure chamber to discharge a liquid from the nozzle, a drive waveform generator configured to generate a drive waveform to be applied to the piezoelectric element of the head. The drive waveform includes a first discharge pulse including two or more expansion waveform elements expanding the pressure chamber in two or more stages, a holding waveform element holding an expanded state of the pressure chamber expanded by a last stage of the expansion waveform element, and a contraction waveform element contracting the pressure chamber from the expanded state held by the holding waveform element, the first discharge pulse configured to drive the piezoelectric element to discharge the liquid from the nozzle, and a second discharge pulse applied to the piezoelectric element after the first discharge pulse, the second discharge pulse configured to drive the piezoelectric element to discharge the liquid from the nozzle, a switch between the head and the drive waveform generator, the switch configured to be switched to an ON-state in which the drive waveform passes the switch or to an OFF-state in which the drive waveform does not pass the switch, and the circuitry configured to control the switch to: switch from the ON state to the OFF-state at a time point after an end point of a first stage of the two or more expansion waveform elements and before a start point of a second stage of the two or more expansion waveform elements of the first discharge pulse, and switch from the OFF-state to the ON-state at a time point after an end point of the contraction waveform element of the first discharge pulse and before a start point of the second discharge pulse.

In further another aspect of this disclosure, a head drive controller is configured to drive the head to discharge a liquid. The head drive controller includes a drive waveform generator configured to generate a drive waveform to be applied to the head, the drive waveform including a non-discharge pulse configured to drive the head to a degree at which the liquid is not discharged; and a discharge pulse applied to the head after the non-discharge pulse, the discharge pulse configured to drive the head to discharge the liquid, a switch between the head and the drive waveform generator, the switch configured to be switched to an ON-state in which the drive waveform passes the switch or to an OFF-state in which the drive waveform does not pass the switch, and circuitry configured to control the switch to switch to the ON-state or the OFF-state in a waveform portion of the non-discharge pulse.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
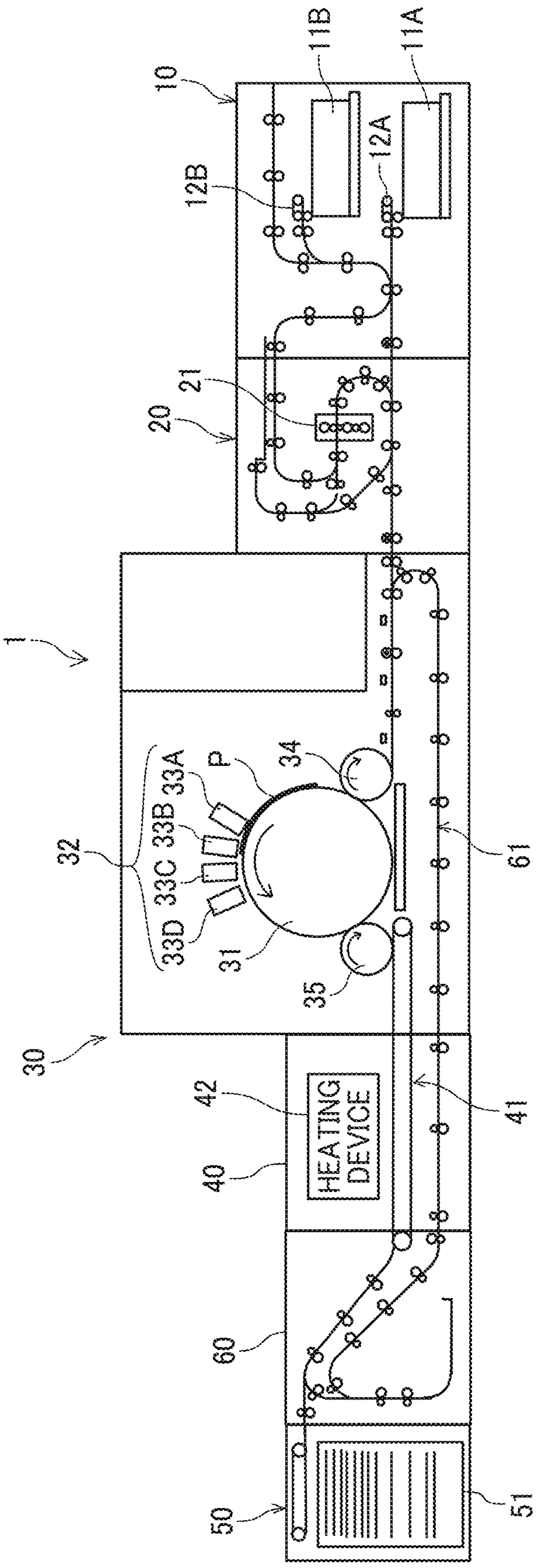
FIG. 1 is a schematic cross-sectional side view of a printer as a liquid discharge apparatus according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a", "an", and "the" are intended to include the plural forms as well, unless the context clearly indicates otherwise.

Figure 2:
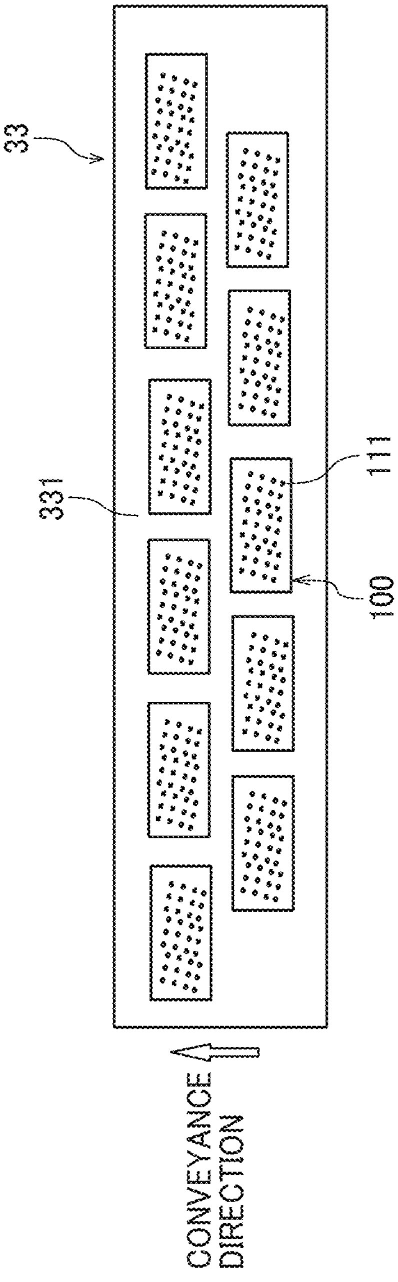
FIG. 2 is a plan view illustrating a discharging unit of the printer of FIG. 1.

Referring now to the drawings, wherein like reference numerals designate identical or corresponding parts throughout the several views, embodiments of the present disclosure are described below. A printer 1 as a liquid discharge apparatus according to a first embodiment of the present disclosure is described with reference to FIGS. 1 and 2. FIG. 1 is a schematic cross-sectional side view of the printer 1 according to the first embodiment of the present disclosure. FIG. 2 is a schematic plan view of a discharge unit 33 of the printer 1.

The printer 1 serves as the liquid discharge apparatus. The printer 1 includes a loading unit 10 to load a sheet P into the printer 1, a pretreatment unit 20, a printing unit 30, a dryer 40, a reverse unit 60, and an ejection unit 50.

In the printer 1, the pretreatment unit 20 applies, as desired, a pretreatment liquid onto the sheet P fed (supplied) from the loading unit 10, the printing unit 30 applies liquid to the sheet P to perform desired printing, the dryer 40 dries the liquid adhering to the sheet P, and the sheet P is ejected to the ejection unit 50. The pretreatment unit 20 serves as a "pretreatment device".

The loading unit 10 includes loading trays 11 (a lower loading tray 11A and an upper loading tray 11B) to accommodate a plurality of sheets P and feeding units 12 (a feeding unit 12A and a feeding unit 12B) to separate and feed the sheets P one by one from the loading trays 11 and supply the sheets P to the pretreatment unit 20.

The pretreatment unit 20 includes, e.g., a coater 21 as a treatment-liquid application unit that coats a printing surface of a sheet P with a treatment liquid having an effect of aggregation of ink particles to prevent bleed-through.

The printing unit 30 includes a drum 31 and a liquid discharge device 32. The drum 31 is a bearer (rotating member) that bears the sheet P on a circumferential surface of the drum 31 and rotates. The liquid discharge device 32 discharges liquid toward the sheet P borne on the drum 31.

The printing unit 30 further includes transfer cylinders 34 and 35. The transfer cylinder 34 receives the sheet P fed from the pretreatment unit 20 and forwards the sheet P to the drum 31. The transfer cylinder 35 receives the sheet P conveyed by the drum 31 and forwards the sheet P to the dryer 40.

The transfer cylinder 34 includes a sheet gripper to grip a leading end of the sheet P conveyed from the pretreatment unit 20 to the printing unit 30. The sheet P thus gripped is conveyed as the transfer cylinder 34 rotates. The transfer cylinder 34 forwards the sheet P to the drum 31 at a position opposite the drum 31.

Similarly, the drum 31 includes a sheet gripper on a surface of the drum 31, and the leading end of the sheet P is gripped by the sheet gripper of the drum 31. The drum 31 includes multiple suction holes dispersed on the surface of the drum 31, and a suction unit generates suction airflow directed from desired suction holes of the drum 31 to an interior of the drum 31.

The sheet gripper of the drum 31 grips the leading end of the sheet P forwarded from the transfer cylinder 34 to the drum 31, and the sheet P is attracted to and borne on the drum 31 by the suction airflows by the suction device. As the drum 31 rotates, the sheet P is conveyed.

The liquid discharge device 32 includes discharge units 33 (discharge units 33A to 33D) as liquid dischargers to discharge liquids. For example, the discharge unit 33A discharges a liquid of cyan (C), the discharge unit 33B discharges a liquid of magenta (M), the discharge unit 33C discharges a liquid of yellow (Y), and the discharge unit 33D discharges a liquid of black (K), respectively. Further, the discharge unit 33 may discharge a special liquid, that is, a liquid of spot color such as white, gold, or silver.

As illustrated in FIG. 2, for example, the discharge unit 33 is a full line head and includes multiple liquid discharge heads 100 according to the embodiments of the present disclosure. The multiple liquid discharge heads 100 are arranged in a staggered manner on a base 331. Each of the liquid discharge head 100 includes multiple nozzles 111 arranged in a two-dimensional matrix. Hereinafter, the "liquid discharge head" is simply referred to as a "head".

The printer 1 controls a discharge operation of each of the discharge units 33 of the liquid discharge device 32 by a drive signal corresponding to print data. When the sheet P borne on the drum 31 passes through a region facing the liquid discharge device 32, the liquids of respective colors are discharged from the discharge units 33, and an image corresponding to the print data is formed on the sheet P.

The drum 31 forwards the sheet P onto which a liquid is applied by the liquid discharge device 32 to the transfer cylinder 35. The transfer cylinder 35 forwards the sheet P fed from the drum 31 to a conveyor 41. The conveyor 41 conveys the sheet P to the dryer 40.

The dryer 40 heats the sheet P conveyed by the conveyor 41 with the heating device 42 to dry the liquid adhering to the sheet P. Thus, a liquid component such as moisture in the liquid evaporates, and the colorant contained in the liquid is fixed on the sheet P. Additionally, curling of the sheet P is restrained.

The reverse unit 60 reverses, in switchback manner, the sheet P that has passed through the dryer 40 in double-sided printing. The reversed sheet P is fed back to the upstream side of the transfer cylinder 34 through a conveyance passage 61 of the printing unit 30.

The ejection unit 50 includes the ejection tray 51 on which the multiple sheets P are stacked. The multiple sheets P conveyed through the reverse unit 60 from the dryer 40 is sequentially stacked and held on an ejection tray 51.

Next, an example of the head 100 of the discharge unit 33 is described with reference to FIGS. 3 to 8.

Figure 3:
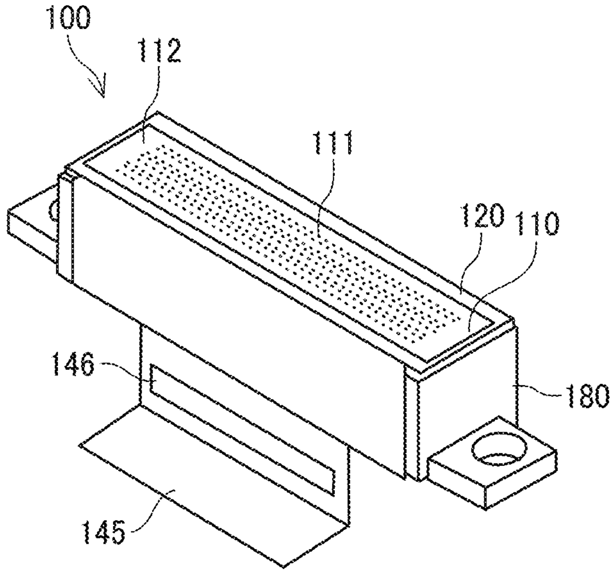
FIG. 3 is an external perspective view of an example of a liquid discharge head of the discharge unit in the first embodiment as viewed from a nozzle surface side.

FIG. 3 is an outer perspective view of the head 100 viewed from a nozzle surface 112 side according to the first embodiment.

Figure 4:
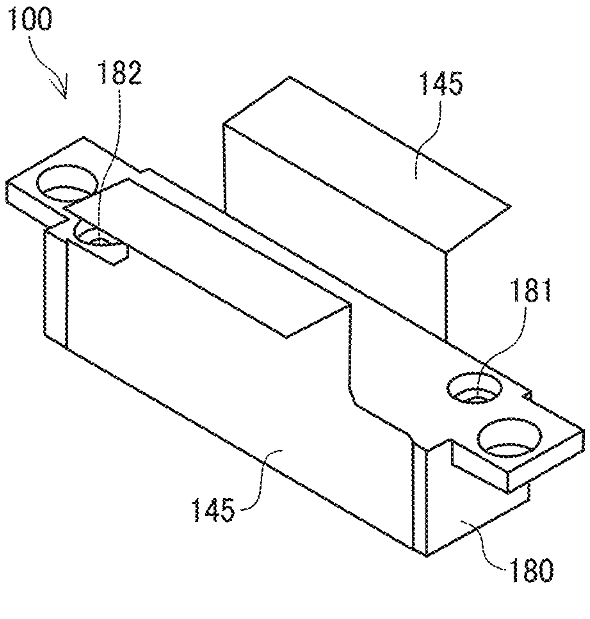
FIG. 4 is an outer perspective view of the liquid discharge head viewed from an opposite side of the nozzle surface side according to the first embodiment of the present disclosure.

FIG. 4 is an outer perspective view of the head 100 viewed from an opposite side of the nozzle surface 112 side according to the first embodiment.

Figure 5:
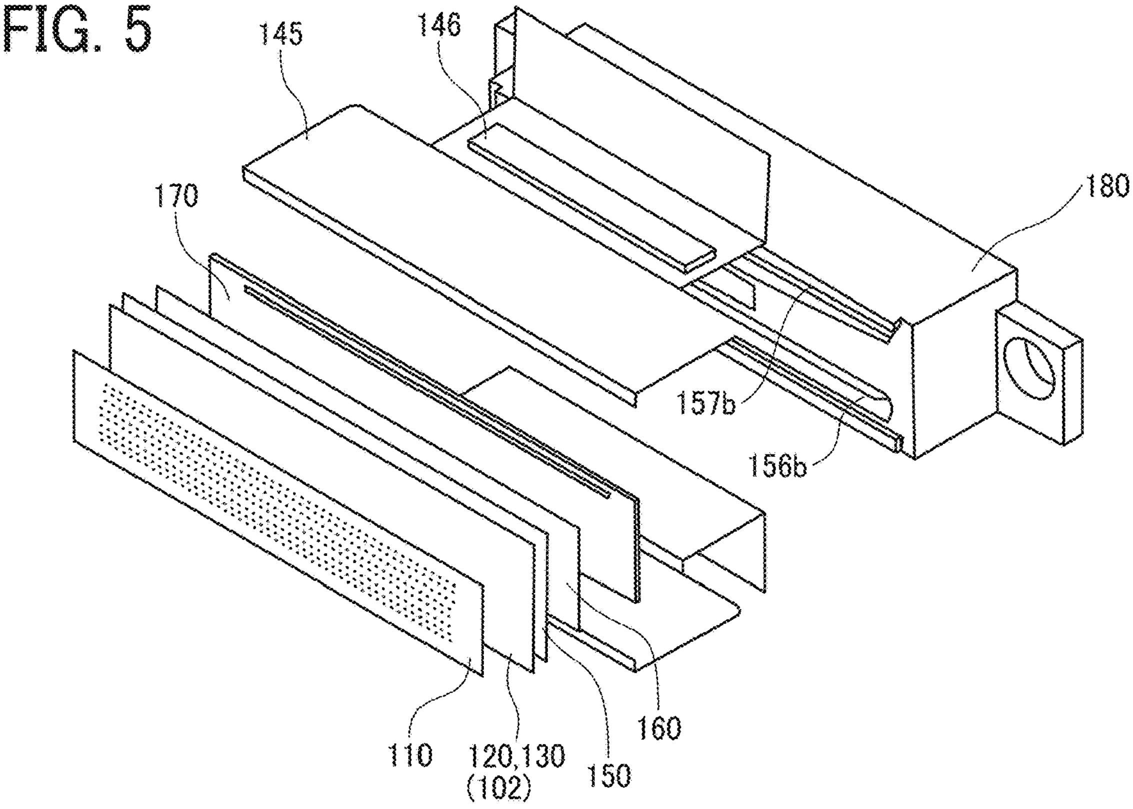
FIG. 5 is an exploded perspective view of the liquid discharge head of FIGS. 3 and 4.

FIG. 5 is an exploded perspective view of the head 100 of FIGS. 3 and 4.

Figure 6:
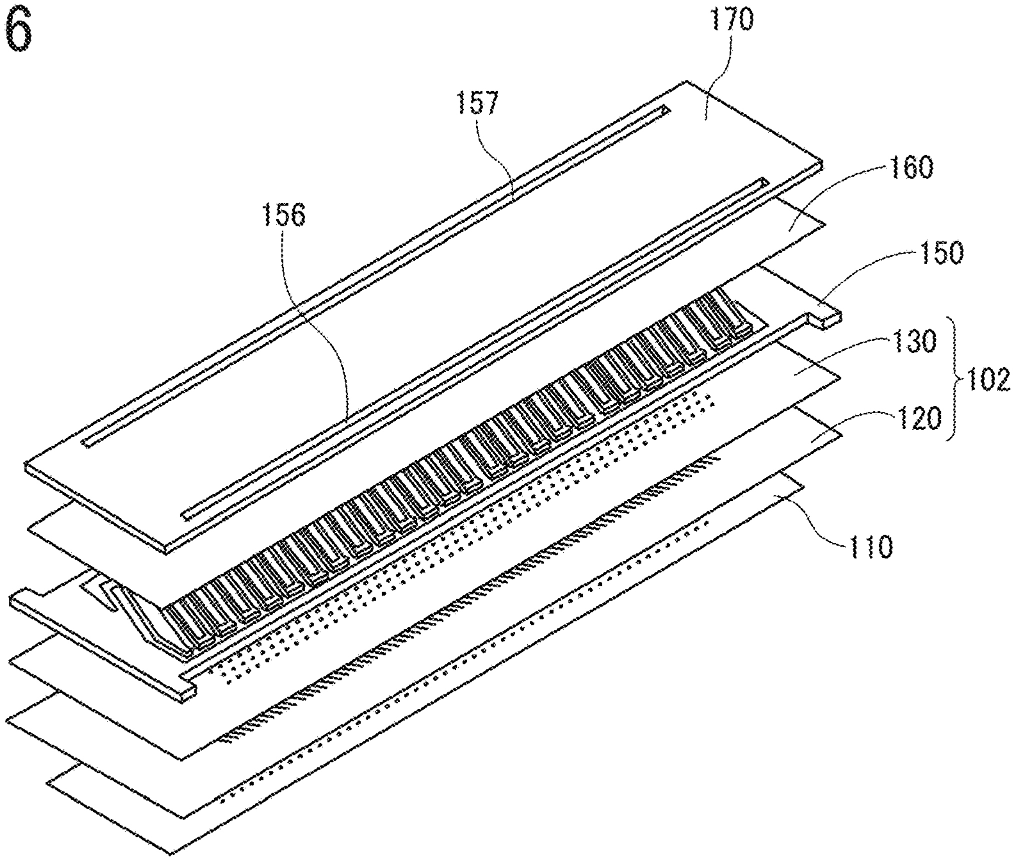
FIG. 6 is an exploded perspective view of a channel forming member of the liquid discharge head according to the first embodiment of the present disclosure.

FIG. 6 is an exploded perspective view of a channel forming member of the head 100 according to the first embodiment.

Figure 7:
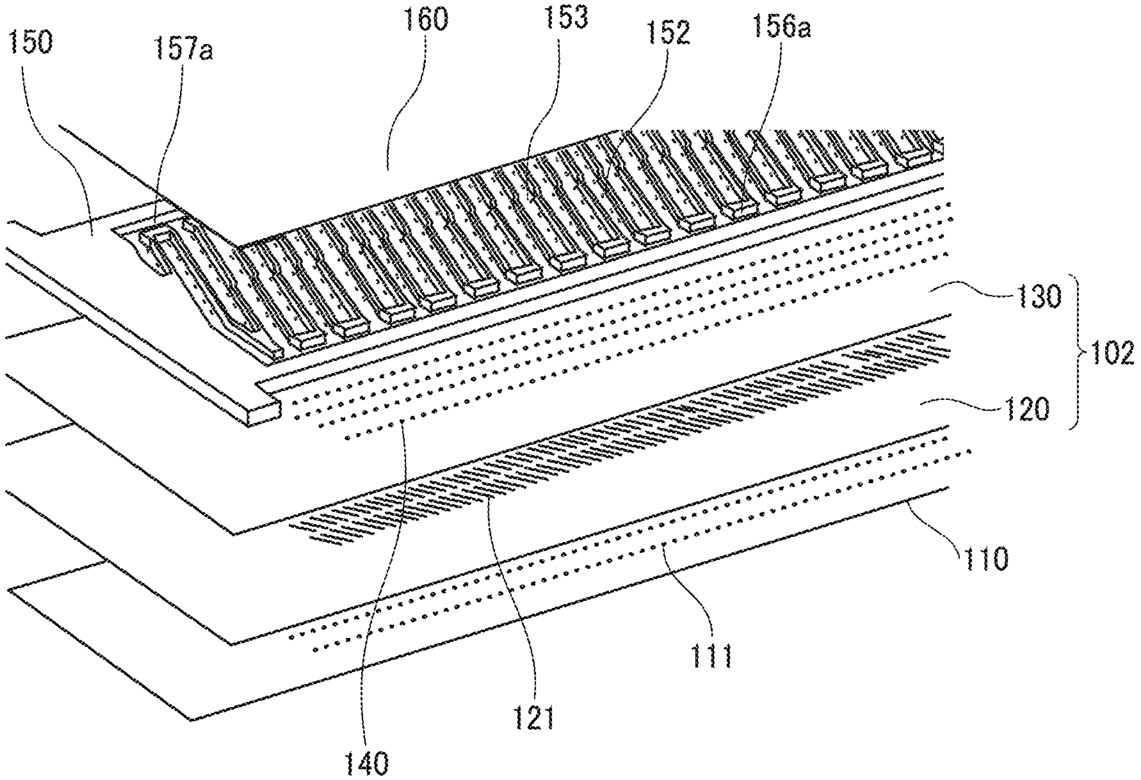
FIG. 7 is an enlarged perspective view of a portion of the channel forming member of FIG. 6.

FIG. 7 is an enlarged perspective view of a portion of the channel forming member of FIG. 6.

Figure 8:
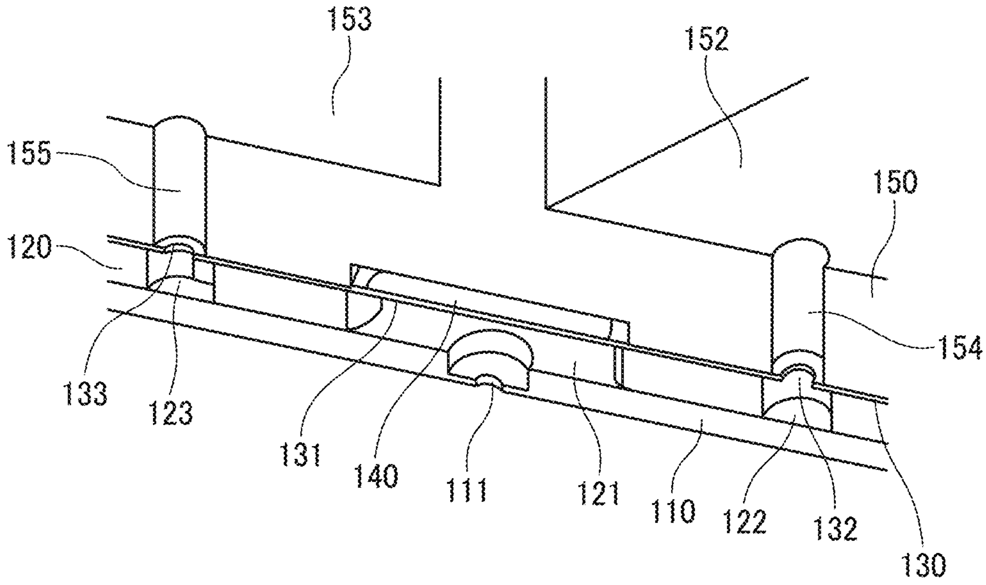
FIG. 8 is a cross-sectional perspective view of channels in the liquid discharge head according to the first embodiment of the present disclosure.

FIG. 8 is a cross-sectional perspective view of channels in the channel forming member of the head 100.

The head 100 includes a nozzle plate 110, a channel plate 120 (individual channel member), a diaphragm member 130, a common-branch channel member 150, a damper 160, a common-main channel member 170, a frame 180, and a flexible wiring 145 (wiring member) as illustrated in FIG. 5. The head 100 includes a head driver 146 mounted on the flexible wiring 145 (wiring member). The head driver 146 is also referred to as a "driver integrated circuit (driver IC)". The head 100 in the first embodiment includes an actuator substrate 102 formed by the channel plate 120 (individual channel member) and the diaphragm member 130 (see FIGS. 5 and 6).

The nozzle plate 110 includes multiple nozzles 111 to discharge a liquid. The multiple nozzles 111 are arrayed in a two-dimensional matrix (see FIG. 2).

The channel plate 120 includes multiple pressure chambers 121 (individual chambers) respectively communicating with the multiple nozzles 111, multiple individual supply channels 122 respectively communicating with the multiple pressure chambers 121, and multiple individual collection channels 123 respectively communicating with the multiple pressure chambers 121 (see FIGS. 7 and 8).

The diaphragm member 130 forms a diaphragm 131 serving as a deformable wall of the pressure chamber 121, and the piezoelectric element 140 is formed on the diaphragm 131 so that the piezoelectric element 140 and the diaphragm 131 form a single body. Further, the diaphragm member 130 includes a supply opening 132 that communicates with the individual supply channel 122 and a collection opening 133 that communicates with the individual collection channel 123 (see FIG. 8). The piezoelectric element 140 is a pressure generator to deform the diaphragm 131 to pressurize the liquid in the pressure chamber 121. The pressure generator may be made of lead-free piezoelectric materials such as aluminum nitride (AlN), potassium sodium niobate (KNN), and the like.

The common-branch channel member 150 includes multiple common-supply branch channels 152 each communicating with two or more individual supply channels 122 and multiple common-collection branch channels 153 each communicating with two or more individual collection channels 123. The multiple common-supply branch channels 152 and the multiple common-collection branch channels 153 are arranged alternately adjacent to each other (see FIGS. 7 and 8).

As illustrated in FIG. 8, the common-branch channel member 150 includes a through hole serving as a supply port 154 that connects the supply opening 132 of the individual supply channel 122 and the common-supply branch channel 152, and a through hole serving as a collection port 155 that connects the collection opening 133 of the individual collection channel 123 and the common-collection branch channel 153.

The common-branch channel member 150 includes a part 156*a* (see FIG. 7) of one or more common-supply main channels 156 (see FIG. 6) each communicating with the multiple common-supply branch channels 152, and a part 157*a* (see FIG. 7) of one or more common-collection main channels 157 (see FIG. 6) each communicating with the multiple common-collection branch channels 153.

The damper 160 includes a supply damper that faces (opposes) the supply port 154 of the common-supply branch channel 152 and a collection damper that faces (opposes) the collection port 155 of the common-collection branch channel 153.

As illustrated in FIG. 7, the damper 160 seals grooves alternately arrayed in the same common-branch channel member 150 to form the common-supply branch channels 152 and the common-collection branch channels 153. The damper 160 forms a deformable wall of the common-supply branch channels 152 and the common-collection branch channels 153. The damper 160 forms the supply damper and the collection damper.

The common-main channel member 170 forms a common-supply main channel 156 that communicates with the multiple common-supply branch channels 152 and a common-collection main channel 157 that communicate with the multiple common-collection branch channels 153 (see FIGS. 6 and 7).

The frame 180 includes a part 156*b* of the common-supply main channel 156 and a part 157*b* of the common-collection main channel 157 (see FIGS. 5 and 6). The part 156*b* (see FIG. 5) of the common-supply main channel 156 (see FIG. 6) communicates with the supply port 181 (see FIG. 4) in the frame 180. The part 157*b* (see FIG. 5) of the common-collection main channel 157 (see FIG. 6) communicates with the collection port 182 (see FIG. 4) in the frame 180.

In the head 100, when a drive pulse is applied to the piezoelectric element 140, the piezoelectric element 140 is bent and deformed to pressurize the liquid in the pressure chamber 121, so that the liquid is discharged from the nozzle 111 as liquid droplets.

When a liquid discharge operation to discharge the liquid from the head 100 is not performed, the liquid which is not discharged from the nozzle 111 circulates through a circulation path outside the head 100. The collection port 182 and the supply port 181 (see FIG. 2) are connected to the circulation path.

Figure 9:
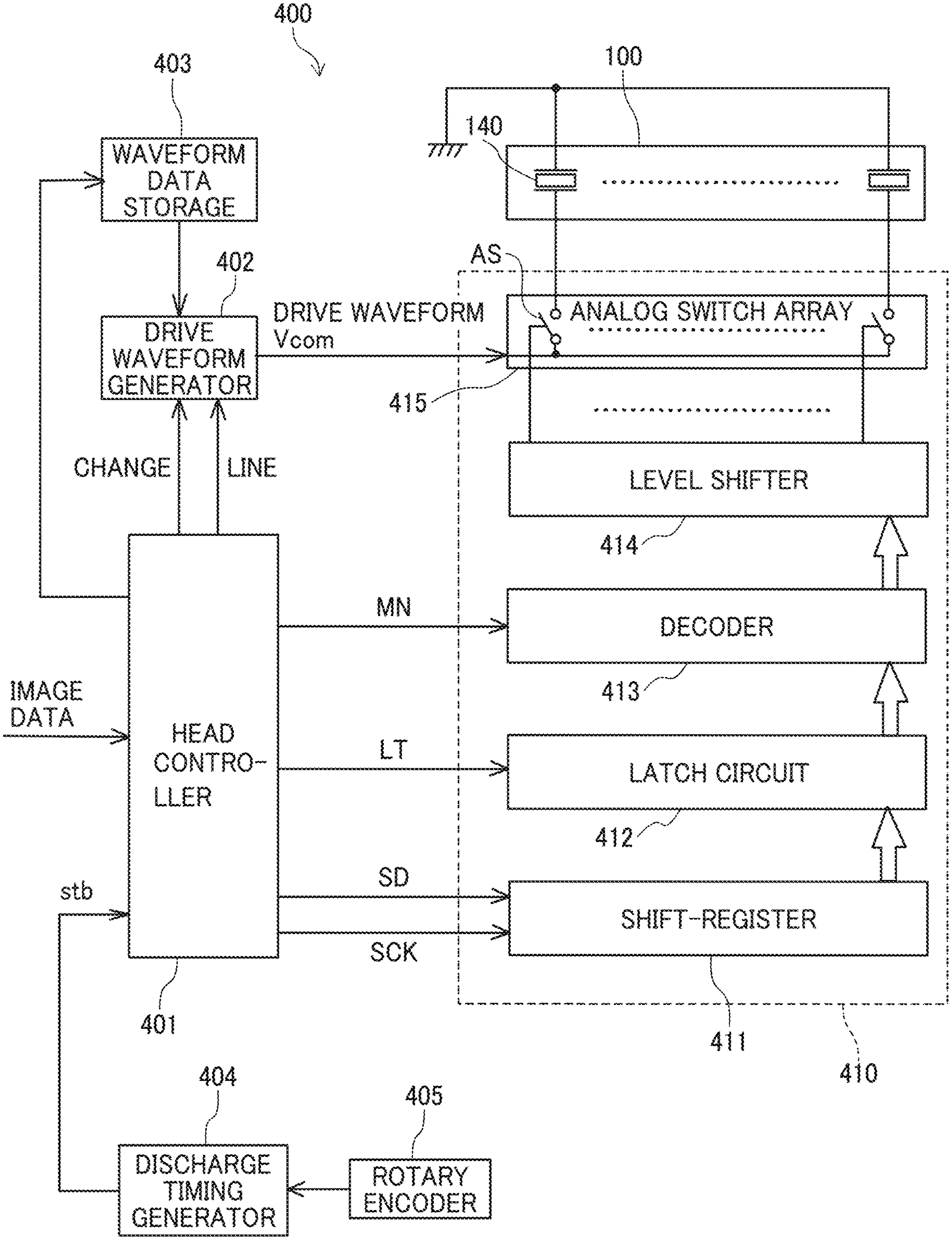
FIG. 9 is a block diagram of a part related to a head drive controller to drive the liquid discharge head of the printer.

Next, a section related to a head drive controller 400 to drive the head 100 is described with reference to a block diagram of FIG. 9.

The head drive controller 400 includes a head controller 401, a drive waveform generator 402 and a waveform data storage 403 that form a drive waveform generator, a head driver 410, and a discharge timing generator 404 to generate a discharge timing.

In response to a reception of a discharge timing pulse stb, the head controller 401 outputs a discharge synchronization signal LINE that triggers generation of a common drive waveform Vcom, to the drive waveform generator 402. The common drive waveform Vcom is simply illustrated as a "drive waveform" in FIG. 9. The head controller 401 outputs a discharge timing signal CHANGE corresponding to an amount of delay from the discharge synchronization signal LINE, to the drive waveform generator 402.

The drive waveform generator 402 generates and outputs a common drive waveform Vcom at a timing based on the discharge synchronization signal LINE and the discharge timing signal CHANGE.

The head controller 401 also serves as a unit that outputs a selection signal for designating a waveform portion to be selected by a selector including an analog switch AS of the head driver 410.

The head controller 401 also serves as an adjusting unit. The head controller 401 receives image data and generates a selection signal MN for selecting a predetermined desired waveform portion of the common drive waveform Vcom for each nozzle 111 according to the size of liquid to be discharged from each nozzle 111 of the head 100 and the characteristic variation of the nozzle 111 based on the image data. Accordingly, the selection signals MN are output by the number of nozzles 111. The selection signal MN is a signal at a timing synchronized with the discharge timing signal CHANGE.

The head controller 401 transmits image data SD, a synchronization clock signal SCK, a latch signal LT instructing latch of the image data, and the generated selection signal MN to the head driver 410.

The head driver 410 is a selector to select a waveform portion to be applied to each pressure generating element (piezoelectric element 140) of the head 100 in the common drive waveform Vcom, based on various signals from the head controller 401.

The head driver 410 includes a shift register 411, a latch circuit 412, a gradation decoder 413, a level shifter 414, and an analog switch array 415.

The shift register 411 receives (inputs) the image data SD and the synchronization clock signal SCK transmitted from the head controller 401 and outputs a resister value to the latch circuit 412. The latch circuit 412 latches each resister value received from the shift register 411 by the latch signal LT transmitted from the head controller 401.

The gradation decoder 413 decodes the value (image data SD) latched by the latch circuit 412 and the selection signal MN for each nozzle 111 and outputs the result. The level shifter 414 converts a level of a logic level voltage signal of the gradation decoder 413 to a level at which an analog switch AS of the analog switch array 415 is operatable.

The analog switch AS of the analog switch array 415 serves as a switch. The analog switch AS is turned on (becomes an ON-state) or turned off (becomes an OFF-state) according to an output of the gradation decoder 413 supplied via the level shifter 414 and switches passing or non-passing (blocking) of the common drive waveform Vcom.

The analog switch AS is provided for each nozzle 111 of the head 100 and is coupled to an individual electrode of the piezoelectric element 140 corresponding to each nozzle 111. The common drive waveform signal Vcom from the drive waveform generator 402 is input to the analog switch AS. A timing of the selection signal MN is synchronized with a timing of the common drive waveform signal Vcom as described above.

Therefore, the analog switch AS is switched between on and off timely in accordance with the output from the gradation decoder 413 via the level shifter 414. The analog switch AS is switched between an ON-state and an OFF-state to select a waveform portion to be applied to the piezoelectric element 140 corresponding to each nozzle 111 from the common drive waveform Vcom. As a result, the size of droplet discharged from the nozzle 111 is controlled.

The discharge timing generator 404 generates and outputs the discharge timing pulse stb each time the sheet P is moved by a predetermined amount, based on a detection result of a rotary encoder 405 to detect a rotation amount of the drum 31. The rotary encoder 405 includes an encoder wheel rotating together with the drum 31 and an encoder sensor to read a slit of the encoder wheel.

Figure 10:
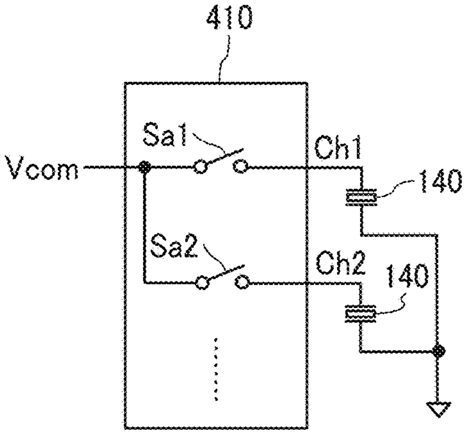
FIG. 10 is a circuit diagram illustrating a part performing a selection of a common drive waveform of a head driver.

Next, an examples of a portion of the head driver 410 that selects the common drive waveform Vcom with reference to FIG. 10.

FIG. 10 is a circuit diagram illustrating a switch portion of the head driver 410.

The head driver 410 applies a drive waveform to the piezoelectric elements 140 via selection switches Sa (Sa1, Sa2, and the like), respectively. The selection switch Sa serves as a switch to input a common drive waveform Vcom as a drive waveform to the piezoelectric elements 140. The selection switch Sa corresponds to the analog switch AS described above. Here, the selection switches Sa1, Sa2, and the like are collectively referred to as "Sa".

The selection switch Sa is switched to the ON-state or the OFF-state by the selection signal MN to cut out (trim) a desired waveform portion of the common drive waveform Vcom. Thus, the desired waveform portion of the common drive waveform Vcom is applied to the piezoelectric element 140 as a trimming waveform Vt (application waveform).

That is, the common drive waveform Vcom passes the selection switch Sa when the selection switch Sa is in the ON-state, and the common drive waveform Vcom does not pass the selection switch Sa when the selection switch Sa is in the OFF-state. When the selection switch Sa becomes the OFF-state, the common drive waveform Vcom becomes a non-passing state. Due to characteristics of the piezoelectric element 140 as a capacitive element, a potential of the piezoelectric element 140 (potential of the trimming waveform Vt) is held at the potential when the selection switch Sa becomes the OFF-state.

Next, a trimming process of the head drive controller 400 according to the first embodiment of the present disclosure is described with reference to FIGS. 11A to 11C and 12.

Figure 11A:
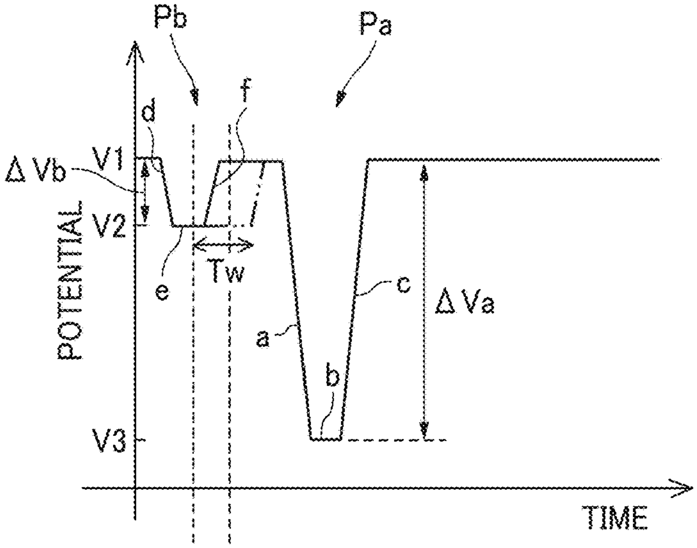
FIGS. 11A to 11C are graphs illustrating an example of a drive waveform, a state of the selection switch, and a trimming waveform (application waveform) to describe a trimming process in the first embodiment of the present disclosure.
Figure 11B:
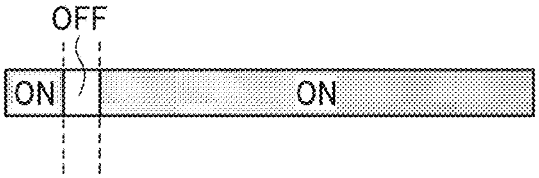
Figure 11C:
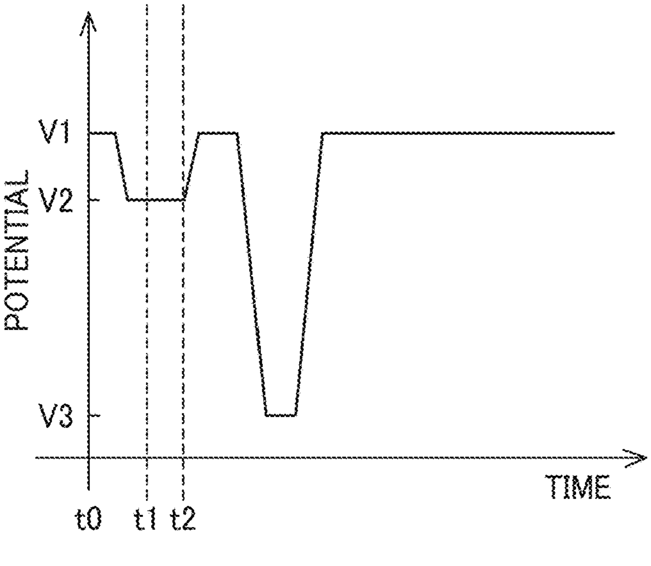

FIGS. 11A to 11C are graphs illustrating an example of a drive waveform, a state of the selection switch Sa, and a trimming waveform (application waveform) to describe the trimming process in the first embodiment of the present disclosure.

Figure 12:
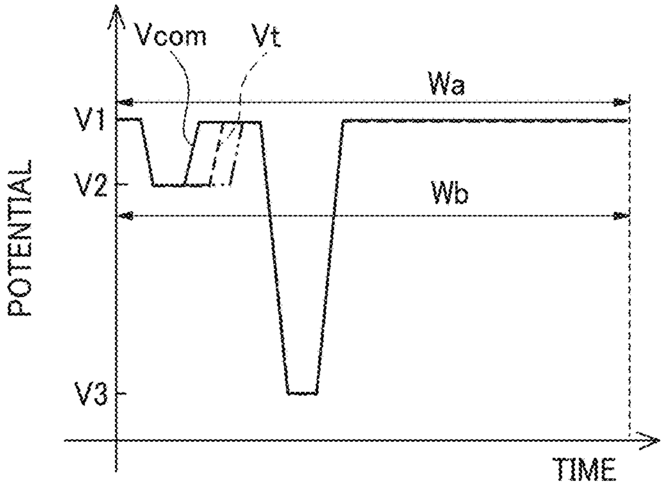
FIG. 12 is a graph illustrating a waveform length of the drive waveform and the trimming waveform same with FIGS. 11A to 11C.

FIG. 12 is a graph illustrating a waveform length of the drive waveform and the trimming waveform same with FIGS. 11A to 11C.

The common drive waveform Vcom of the first embodiment includes a non-discharge pulse Pb and a discharge pulse Pa in time series. The discharge pulse Pa is a discharge drive waveform to pressurize the pressure chamber 121 and discharge a liquid from the nozzle 111. The discharge pulse Pa is a pulse for discharging, for example, a small droplet. However, the size of the droplet discharged by the discharge pulse Pa is not limited to the small droplet, and the same applies to the following embodiments. The non-discharge pulse Pb is a micro vibration waveform (a non-discharge drive waveform) to pressurize the liquid in the nozzle 111 to a degree at which the liquid is not discharged from the nozzle 111 to vibrate a meniscus of the liquid in the nozzle 111.

The discharge pulse Pa includes an expansion waveform element "a" for expanding the pressure chamber 121, a holding waveform element "b" for holding an expanded state of the pressure chamber 121 expanded by the expansion waveform element a, and a contraction waveform element "c" for contracting the pressure chamber 121 from the expanded state held by the holding waveform element b to discharge liquid.

In this first embodiment, the expansion waveform element a is at an intermediate potential (or referred to as a reference potential) in this first embodiment. The expansion waveform element a falls to the potential V3 (V1>V3) having the potential difference ΔVa with respect to the intermediate potential V1. The holding waveform element b holds the potential V3 that is a terminal potential of the expansion waveform element a. The contraction waveform element c rises from the potential V3 held by the holding waveform element b to the intermediate potential V1.

The non-discharge pulse Pb includes an expansion waveform element "d" for expanding the pressure chamber 121, a holding waveform element "e" for holding an expanded state of the pressure chamber 121 expanded by the expansion waveform element d, and a contraction waveform element "f" for contracting the pressure chamber 121 from an expanded state held by the holding waveform element e.

In the first embodiment, the expansion waveform element d falls to the potential V2 (V1>V2>V3) having a potential difference ΔVb with respect to the intermediate potential V1. The holding waveform element e holds the potential V2 that is a terminal potential of the expansion waveform element d.

The contraction waveform element of rises from the potential V2 held by the holding waveform element e to the intermediate potential V1.

As described above, the non-discharge pulse Pb is a pull-type pulse that falls from the intermediate potential V1 to expand the pressure chamber 121, holds the expanded state, and then rises to contract the pressure chamber 121 in time series in the first embodiment.

As illustrated in FIG. 11B, when the liquid is discharged from the nozzle 111, the selection switch Sa is controlled to be switched to the ON-state or the OFF-state to pass not only the discharge pulse Pa but also a part of the waveform of the non-discharge pulse Pb in the first embodiment.

Here, the selection switch Sa is switched to the ON-state at a time point t0 before a start point of the expansion waveform element d of the non-discharge pulse Pb, and the selection switch Sa is switched from the ON-state to the OFF-state at a time point t1 in a waveform portion in the holding waveform element e.

At this time, all of the expansion waveform elements d of the non-discharge pulse Pb are selected and passed, and a part of the holding waveform elements e holding the potential V2 at a terminal end of the expansion waveform elements d is selected and passed the selection switch Sa. In response to the selection switch Sa becoming the OFF-state, the potential of the piezoelectric element 140 is held at the potential V2. The potential V2 is a potential when the selection switch Sa becomes the OFF-state.

Then, the selection switch Sa is switched from the OFF-state to the ON-state at a time point t2 after an end of the contraction waveform element f of the non-discharge pulse Pb. The contraction waveform element c rises from the potential V2 held by the holding waveform element e to the intermediate potential V1 in response to the selection switch Sa becoming the ON-state.

Thus, the selection switch Sa is disposed between the head 100 and the drive waveform generator 402 to connect the head 100 and the drive waveform generator 402. The selection switch Sa is configured to be switched to an ON-state in which the drive waveform passes the selection switch Sa or to an OFF-state in which the drive waveform does not pass the selection switch Sa. The head controller 401 (circuitry) is configured to control the selection switch Sa to switch to the ON-state or the OFF-state in a waveform portion of the non-discharge pulse Pb.

As a result, as illustrated in FIG. 11C, the trimming waveform Vt falls from the intermediate potential V1 to the potential V2 in accordance with the expansion waveform element d of the non-discharge pulse Pb from the time point t0. The potential V2 is maintained even after the time point t1, and the waveform rises from the potential V2 to the intermediate potential V1 at the time point t2. Then, the trimming waveform Vt becomes the same shape as the common drive waveform Vcom after the time point t2.

As illustrated in FIG. 12, a waveform length Wa of the common drive waveform Vcom input to the selection switch Sa becomes the same as the waveform length Wb of the trimming waveform Vt.

Here, the time point t2 is changed to change the timing, at which the trimming waveform Vt rises from the potential V2 to the intermediate potential V1 to contract the pressure chamber 121. The selection switch Sa is switched from the OFF-state to the ON-state at the time point t2 after the selection switch Sa is switched from the ON-state to the OFF-state at the time point t1. Thus, the timing (time point t2) at which the pressure chamber 121 contracts is changed to change the discharge characteristics.

Therefore, the timing (time point t2) is set within a trimming region Tw indicated in FIG. 11A so that the discharge characteristics of each nozzle 111 become the target characteristics, for example. That is, the selection switch Sa is switched from the OFF-state to the ON-state at the time point t2 at which the common drive waveform Vcom is changed from the non-passing state to a passing state to pass through the selection switch Sa.

Thus, the head drive controller 400 according to the first embodiment can apply the trimming waveform Vt corresponding to the correction amount (adjustment amount) for each nozzle 111 while maintaining the waveform length of the driving waveform.

Further, the waveform is trimmed in a portion of the non-discharge pulse Pb (micro drive portion) of the common drive waveform Vcom so that the head drive controller 400 can correct the variation in the discharge characteristics even for the head 100 including the pressure chamber 121 having a short natural period. The natural period is also referred to as a "natural vibration period" or "resonance period".

Further, the non-discharge pulse Pb is trimmed to control a state of the meniscus (shape of the meniscus or the like) to correct the shape of the discharge droplet to reduce a variation in the discharge deflection amount if the non-discharge pulse Pb is a pull-type pulse as in the first embodiment.

Comparative Example 1 is described below with reference to FIGS. 13A to 13C.

Figure 13A:
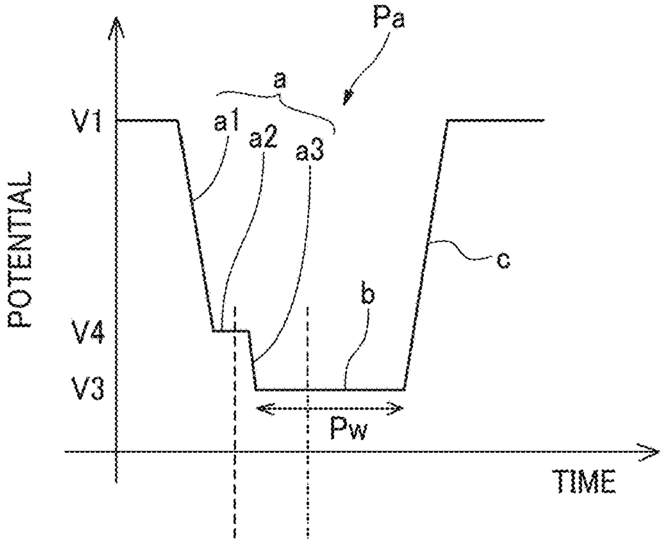
FIGS. 13A to 13C are graphs illustrating an example of a drive waveform, a state of the selection switch, and a trimming waveform to describe a trimming process in a Comparative Example 1.
Figure 13B:
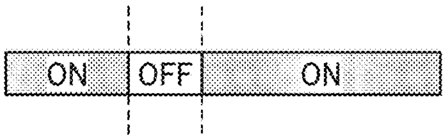
Figure 13C:
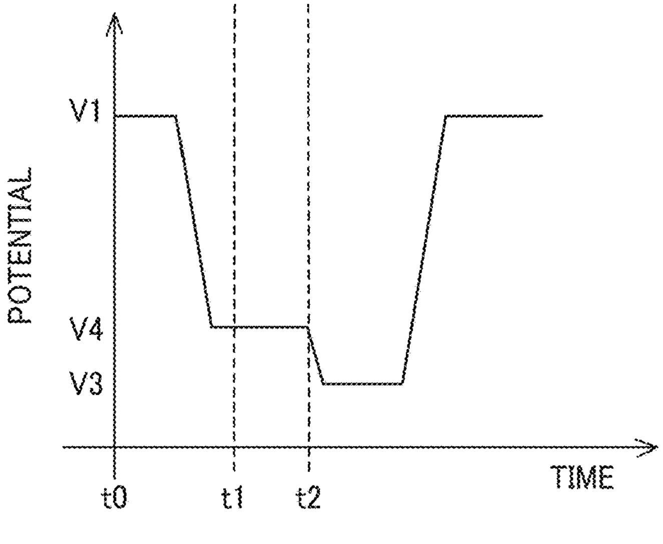

FIGS. 13A to 13C are graphs illustrating an example of a drive waveform, a state of the selection switch Sa, and the trimming waveform Vt to describe a trimming process in the Comparative Example 1.

As illustrated in FIG. 13A, the discharge pulse Pa includes an expansion waveform element a, a holding waveform element b, and a contraction waveform element c in Comparative Example 1.

Here, the expansion waveform element a is a waveform that performs two stage expansion. The expansion waveform element a includes a first-stage expansion waveform element a1 for expanding the pressure chamber 121, a first-stage holding waveform element a2 for holding the expanded state expanded by the first-stage expansion waveform element a1, and a second-stage expansion waveform element a3 for further expanding the pressure chamber 121 from the expanded state held by the first-stage holding waveform element a2.

The first-stage expansion waveform element a1 falls from an intermediate potential V1 to a potential V4 (V1>V4>V3). The first-stage holding waveform element a2 holds the potential V4. The second-stage expansion waveform element a3 falls from the potential V4 to a potential V3.

The holding waveform element b holds the potential V3 that is a terminal potential of the second-stage expansion waveform element a3. The contraction waveform element c rises from the potential V3 held by the holding waveform element b to the intermediate potential V1.

As illustrated in FIG. 13B, the selection switch Sa is switched from the ON-state to the OFF-state in the middle of the first-stage holding waveform element a2 of the expansion waveform element "a" and switches from the OFF-state to the ON-state in the middle of the holding waveform element b in Comparative Example 1.

Thus, the discharge pulse Pa of the common drive waveform Vcom illustrated in FIG. 13A is trimmed to obtain the trimming waveform Vt (application waveform) in which a width Pw of the holding waveform element b has been changed (reduced) as illustrated in FIG. 13C.

As the printing speed of a line printer or the like increases, the natural period of the head tends to be shortened in order to drive the head at high speed. In addition, in the case where the discharged droplets are made into fine droplets for the purpose of improving image quality, the natural cycle of the head tends to be shortened.

When the trimming process as in Comparative Example 1 is performed on such a head having a short natural period, a sufficient time may not be taken for a period (width Pw) of the holding waveform element b if the time for switching and the time for voltage displacement are subtracted.

When a head having a natural period of about 3 μsec (microseconds) is used, for example, a time from a start of the expansion waveform element a to an end of the contraction waveform element c is only about 1.5 to 2.5 μsec. Accordingly, a time that can be used for the width Pw of the holding waveform element b hardly remains and the variation in the discharge characteristics may not be corrected.

On the other hand, the head drive controller 400 according to the first embodiment does not perform trimming on the holding waveform element b of the discharge pulse Pa that holds the pressure chamber 121 in the most expanded state. Thus, the head drive controller 400 according to the first embodiment performs the trimming process on the waveform portion of the non-discharge pulse Pb of the common drive waveform Vcom so that the head drive controller 400 can reduce the variation in discharge characteristics even for the head 100 having a short natural period.

Next, a trimming process performed by the head drive controller 400 according to a second embodiment of the present disclosure is described with reference to FIG. 14.

Figure 14A:
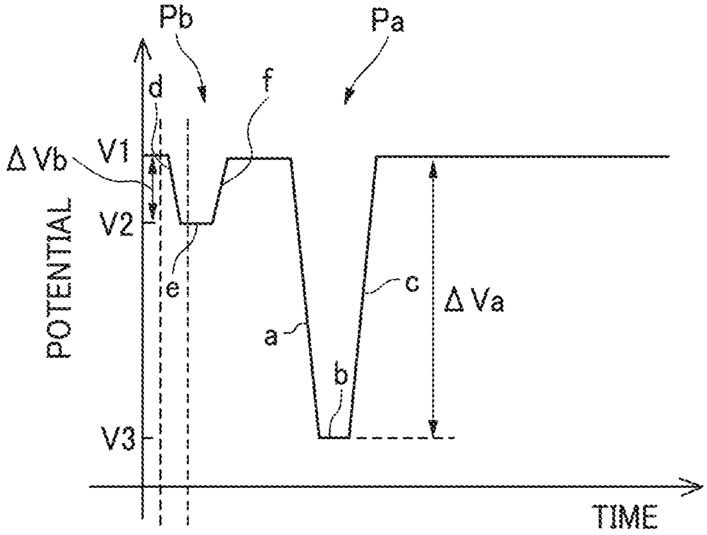
FIGS. 14A to 14C are graphs illustrating an example of a drive waveform, a state of the selection switch, and a trimming waveform (application waveform) to describe a trimming process in a second embodiment of the present disclosure.
Figure 14B:
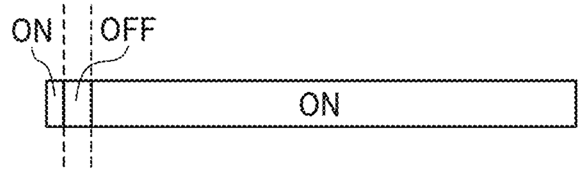
Figure 14C:
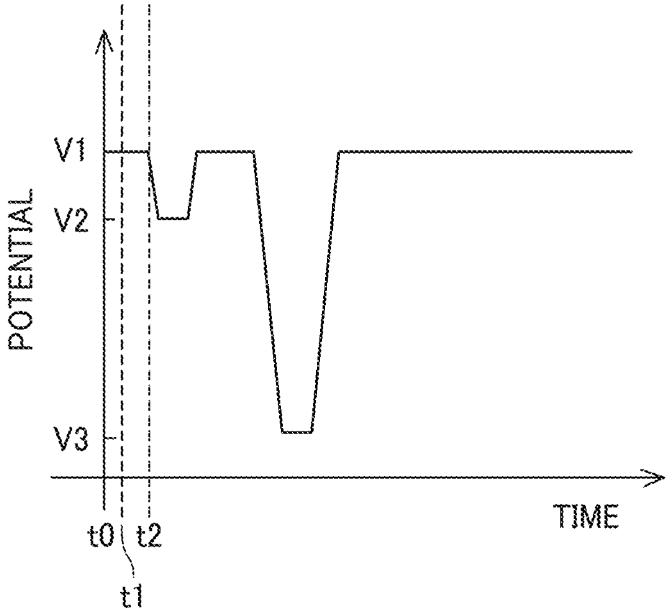

FIGS. 14A to 14C are graphs illustrating an example of a drive waveform, a state of the selection switch Sa, and a trimming waveform (application waveform) to describe the trimming process in the second embodiment of the present disclosure.

The common drive waveform Vcom in the second embodiment includes a non-discharge pulse Pb and a discharge pulse Pa in time series as illustrated in FIG. 14A. The discharge pulse Pa is a discharge drive waveform to pressurize the pressure chamber 121 and discharge a liquid from the nozzle 111. The non-discharge pulse Pb is a micro drive waveform (a non-discharge drive waveform) to pressurize the liquid in the nozzle 111 to the degree at which the liquid is not discharged from the nozzle 111 to vibrate a meniscus of the liquid in the nozzle 111.

Since the discharge pulse Pa and the non-discharge pulse Pb have the same waveforms as the waveforms of the discharge pulse Pa and the non-discharge pulse Pb described in the first embodiment, description of which is omitted below.

As illustrated in FIG. 14B, when the liquid is discharged from the nozzle 111, the selection switch Sa is controlled to be switched to the ON-state or the OFF-state to pass not only the discharge pulse Pa but also a part of the waveform of the non-discharge pulse Pb in the second embodiment.

Here, the selection switch Sa is switched from ON-state to OFF-state at a time point t1 before a start point of the expansion waveform element d of the non-discharge pulse Pb, and the selection switch Sa is switched from the OFF-state to the ON-state at a time point t2 in the holding waveform element e.

At this time, the expansion waveform element d of the non-discharge pulse Pb does not pass through the selection switch Sa, and the potential of the piezoelectric element 140 is held at the intermediate potential V1 even after the time t1. The intermediate potential V1 is a potential when the selection switch Sa becomes the OFF-state. Then, the potential starts to fall from the intermediate potential V1 to the potential V2 of the holding waveform element e at the time point t2 when the selection switch Sa is switched from the OFF-state to the ON-state. After the potential falls to the potential V2, the common drive waveform Vcom passes the selection switch Sa as it is without the trimming process.

Accordingly, as illustrated in FIG. 14C, the trimming waveform Vt becomes a waveform in which the start point of the expansion waveform element d of the non-discharge pulse Pb starts from the time point t2, and then the trimming waveform Vt becomes the same shape as the common drive waveform Vcom.

Thus, the head controller 401 (circuitry) is configured to control the selection switch Sa to switch from the ON-state to the OFF-state before a start point of the expansion waveform element d, and switch from the OFF-state to the ON-state in a waveform portion of the holding waveform element e.

Here, the time point t2 is changed to change the timing, at which the pressure chamber 121 expands by the non-discharge pulse Pb. The selection switch Sa is switched from the OFF-state to the ON-state at the time point t2 after the selection switch Sa is switched from the ON-state to the OFF-state at the time point t1. Thus, the timing (time point t2) at which the pressure chamber 121 expands is changed to change the discharge characteristics.

Therefore, the timing (time point t2) is set so that the discharge characteristics of each nozzle 111 become the target characteristics, for example. That is, the selection switch Sa is switched from the ON-state to the OFF-state at the time point t2 at which the common drive waveform Vcom is changed from the passing state to the non-passing state.

Further, a part of the expansion waveform element (falling waveform element of the potential) of the non-discharge pulse Pb (micro drive portion) is trimmed to control a state of the meniscus (shape of the meniscus or the like) to correct the shape of the discharge droplet to reduce a variation in the discharge deflection amount.

The head drive controller 400 according to the second embodiment does not trim the holding waveform element b of the discharge pulse Pa holding the most expanded state of the pressure chamber 121. Thus, the head drive controller 400 according to the second embodiment can reduce the variation in the discharge characteristics even for the head 100 having a short natural period.

Next, a trimming process of the head drive controller 400 according to a third embodiment of the present disclosure is described with reference to FIGS. 15A to 15C and 16.

Figure 15A:
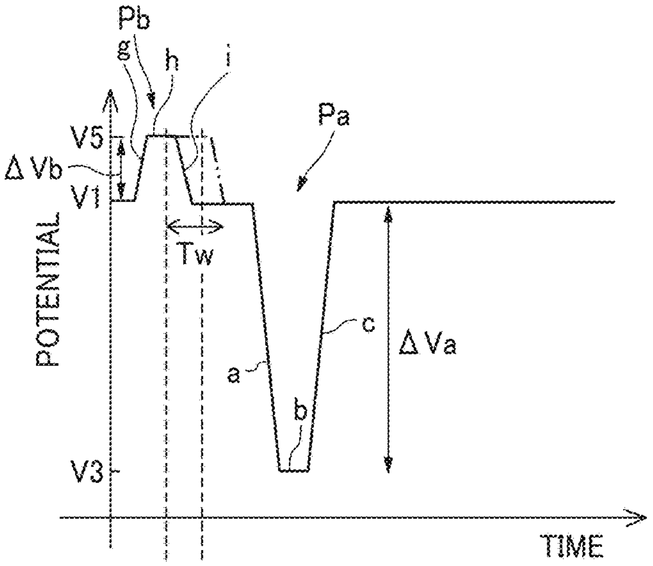
FIGS. 15A to 15C are graphs illustrating an example of a drive waveform, a state of the selection switch, and a trimming waveform (application waveform) to describe a trimming process in a third embodiment of the present disclosure.
Figure 15B:
Figure 15C:
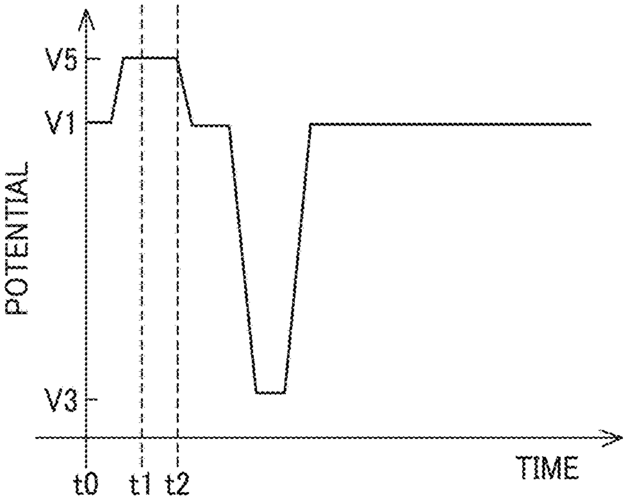

FIGS. 15A to 15C are graphs illustrating an example of a drive waveform, a state of the selection switch Sa, and a trimming waveform (application waveform) to describe the trimming process in the third embodiment of the present disclosure.

Figure 16:
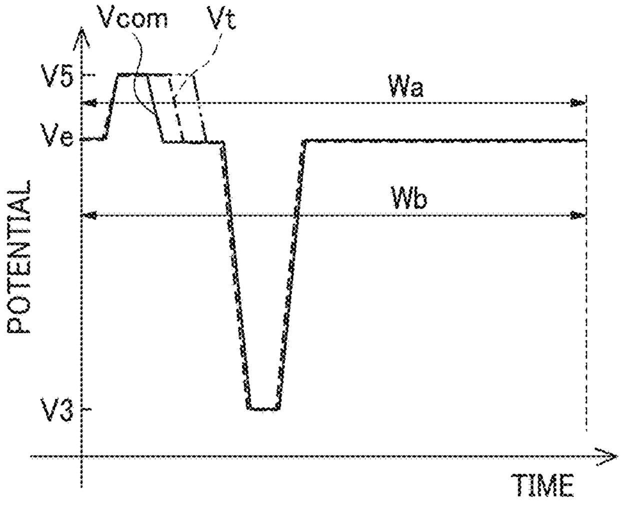
FIG. 16 is a graph illustrating a waveform length of the drive waveform and the trimming waveform same with FIGS. 15A to 15C.

FIG. 16 is a graph illustrating a waveform length of the drive waveform and the trimming waveform same with FIGS. 15A to 15C.

The common drive waveform Vcom of the first embodiment includes a non-discharge pulse Pb and a discharge pulse Pa in time series. The discharge pulse Pa is a discharge drive waveform to pressurize the pressure chamber 121 and discharge a liquid from the nozzle 111. The discharge pulse Pa is a pulse for discharging, for example, a small droplet. The non-discharge pulse Pb is a micro drive waveform (a non-discharge drive waveform) to pressurize the liquid in the nozzle 111 to the degree at which the liquid is not discharged from the nozzle 111 to vibrate a meniscus of the liquid in the nozzle 111.

The discharge pulse Pa includes an expansion waveform element "a" for expanding the pressure chamber 121, a holding waveform element "b" for holding an expanded state of the pressure chamber 121 expanded by the expansion waveform element a, and a contraction waveform element "c" for contracting the pressure chamber 121 from the expanded state held by the holding waveform element b to discharge liquid.

The expansion waveform element a falls to the potential V3 (V1>V3) having a potential difference ΔVa with respect to the intermediate potential V1 (or reference potential). The holding waveform element b holds the potential V3 that is a terminal potential of the expansion waveform element a. The contraction waveform element c rises from the potential V3 held by the holding waveform element b to the intermediate potential V1.

The non-discharge pulse Pb includes a contraction waveform element "g" to contract the pressure chamber 121, a holding waveform element "h" to hold a contracted state of the pressure chamber 121 contracted by the contraction waveform element g, and an expansion waveform element "i" to expand the pressure chamber 121 from the contracted state held by the holding waveform element h.

The contraction waveform element g rises to the potential V5 (V5>V1) having a potential difference ΔVb with respect to the intermediate potential V1 (or reference potential). The holding waveform element h holds the potential V5 that is a terminal potential of the contraction waveform element g. The expansion waveform element i falls from the potential V5 held by the holding waveform element h to the intermediate potential V1.

As described above, the non-discharge pulse Pb is a push-type pulse that rises from the intermediate potential V1 to contract the pressure chamber 121, holds the contracted state, and then falls to expand the pressure chamber 121 in time series in the third embodiment.

As illustrated in FIG. 15B, when the liquid is discharged from the nozzle 111, the selection switch Sa is controlled to be switched to the ON-state or the OFF-state to pass not only the discharge pulse Pa but also a part of the waveform of the non-discharge pulse Pb in the third embodiment.

Here, the selection switch Sa is switched to the ON-state at a time point t0 before a start point of the contraction waveform element g of the non-discharge pulse Pb, and the selection switch Sa is switched from the ON-state to the OFF-state at a time point t1 of the holding waveform element h.

At this time, all of the contraction waveform elements g of the non-discharge pulse Pb are selected and passed, and a part of the holding waveform elements h holding the potential V5 at a terminal end of the contraction waveform elements g is selected and passed the selection switch Sa. In response to the selection switch Sa becoming the OFF-state, the potential of the piezoelectric element 140 is held at the potential V5. The potential V5 is a potential when the selection switch Sa becomes the OFF-state.

Then, the selection switch Sa is switched from the OFF-state to the ON-state at a time point t2 after an end of the holding waveform element h of the non-discharge pulse Pb. The potential of the piezoelectric element 140 falls from the potential V5 held by the holding waveform element h to the intermediate potential V1 in response to the selection switch Sa becoming the ON-state.

Thus, the head controller 401 (circuitry) is configured to control the selection switch Sa to switch from the ON state to the OFF-state at time point t1 of a waveform portion of the holding waveform element h, and switch from the OFF-state to the ON-state at a time point t2 after an end point of the expansion waveform element i and before a start point of the discharge pulse Pa.

As a result, as illustrated in FIG. 15C, the trimming waveform Vt rises from the intermediate potential V1 to the potential V5 in accordance with the contraction waveform element g of the non-discharge pulse Pb from the time point t0. The potential V5 is maintained even after the time point t1, and the waveform falls from the potential V5 to the intermediate potential V1 at the time point t2. Then, the trimming waveform Vt becomes the same shape as the common drive waveform Vcom after the time point t2.

As illustrated in FIG. 16, a waveform length Wa of the common drive waveform Vcom input to the selection switch Sa becomes the same as the waveform length Wb of the trimming waveform Vt.

Here, the time point t2 is changed to change the timing, at which the trimming waveform Vt falls from the potential V5 to the intermediate potential V1 to expand the pressure chamber 121. The selection switch Sa is switched from the OFF-state to the ON-state at the time point t2 after the selection switch Sa is switched from the ON-state to the OFF-state at the time point t1. Thus, the timing (time point t2) at which the pressure chamber 121 expands is changed to change the discharge characteristics.

Therefore, the timing (time point t2) is set within a trimming region Tw indicated in FIG. 15A so that the discharge characteristics of each nozzle 111 become the target characteristics, for example. That is, the selection switch Sa is switched from the OFF-state to the ON-state at the time point t2 at which the common drive waveform Vcom is changed from the non-passing state to the passing state to pass through the selection switch Sa.

Thus, the head drive controller 400 according to the first embodiment can apply the trimming waveform Vt corresponding to the correction amount (adjustment amount) for each nozzle 111 while maintaining the waveform length of the driving waveform. Further, the waveform is trimmed in a portion of the non-discharge pulse Pb (micro drive portion) of the common drive waveform Vcom so that the head drive controller 400 can correct the variation in the discharge characteristics even for the head 100 including the pressure chamber 121 having a short natural period. The natural period is also referred to as a "natural vibration period" or "resonance period".

Further, the non-discharge pulse Pb is trimmed to control a state of the meniscus (shape of the meniscus or the like) to correct the shape of the discharge droplet to reduce a variation in the discharge deflection amount if the non-discharge pulse Pb is a push-type pulse as in the third embodiment. Further, when the non-discharge pulse Pb is a push-type pulse, the head drive controller 400 can correct a droplet volume and a droplet speed of the discharge droplet.

Next, a trimming process performed by the head drive controller 400 according to a fourth embodiment of the present disclosure is described with reference to FIGS. 17A to 17C.

Figures 17A, 17B, 17C:
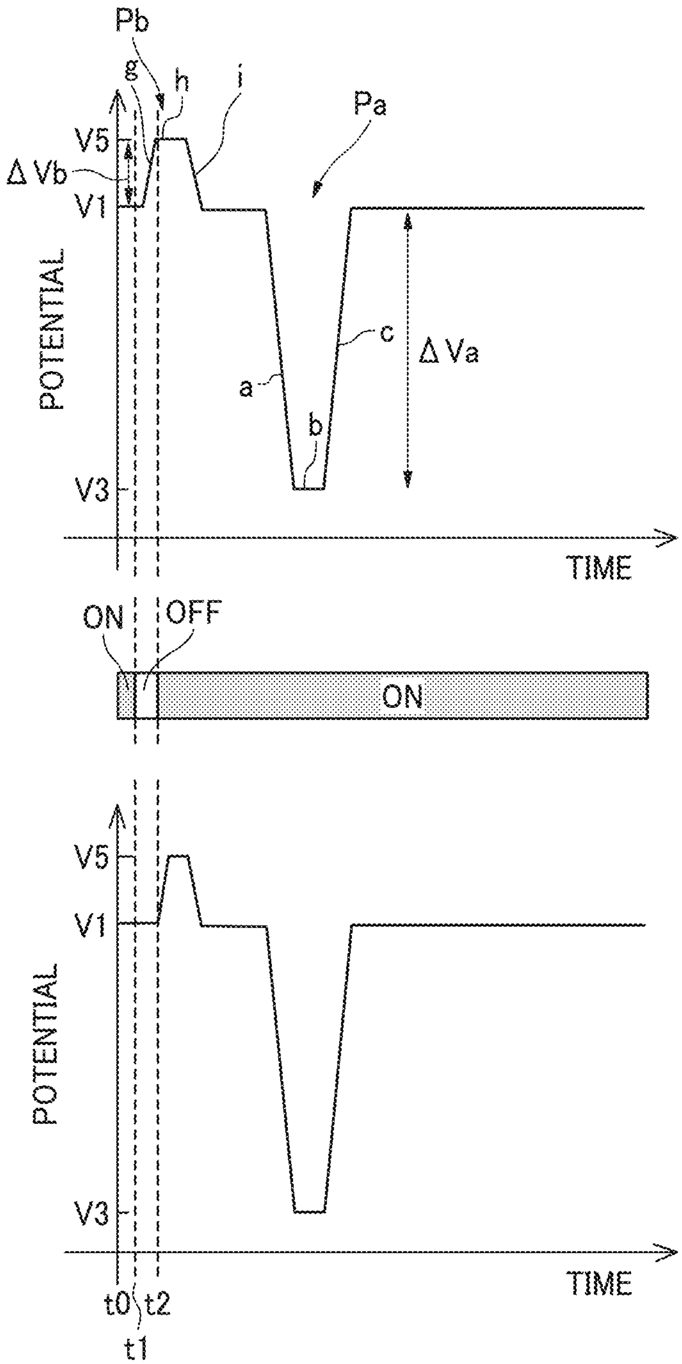
FIGS. 17A to 17C are graphs illustrating an example of a drive waveform, a state of the selection switch, and a trimming waveform (application waveform) to describe a trimming process in a fourth embodiment of the present disclosure.

FIGS. 17A to 17C are graphs illustrating an example of a drive waveform, a state of the selection switch Sa, and a trimming waveform Vt (application waveform) to describe the trimming process in the fourth embodiment of the present disclosure.

The common drive waveform Vcom of the fourth embodiment includes a non-discharge pulse Pb and a discharge pulse Pa in time series as illustrated in FIG. 17A. The discharge pulse Pa is a discharge drive waveform to pressurize the pressure chamber 121 and discharge a liquid from the nozzle 111. The non-discharge pulse Pb is a micro drive waveform (a non-discharge drive waveform) to pressurize the liquid in the nozzle 111 to the degree at which the liquid is not discharged from the nozzle 111 to vibrate a meniscus of the liquid in the nozzle 111.

Both the discharge pulse Pa and the non-discharge pulse Pb according to the fourth embodiment are the same as the discharge pulse Pa and the non-discharge pulse Pb of the third embodiment.

As illustrated in FIG. 17B, when the liquid is discharged from the nozzle 111, the selection switch Sa is controlled to be switched to the ON-state or the OFF-state to pass not only the discharge pulse Pa but also a part of the waveform of the non-discharge pulse Pb in the fourth embodiment.

Here, the selection switch Sa is switched from ON-state to OFF-state at a time point t1 before a start point of the contraction waveform element g of the non-discharge pulse Pb, and the selection switch Sa is switched from the OFF-state to the ON-state at a time point t2 in the holding waveform element h. The time point t2 is after an end point of the contraction waveform element g and before a start point of the expansion waveform element i.

At this time, the contraction waveform element g of the non-discharge pulse Pb does not pass through the selection switch Sa, and the potential of the piezoelectric element 140 is held at the intermediate potential V1 even after the time t1. The intermediate potential V1 is a potential when the selection switch Sa becomes the OFF-state. Then, the potential starts to rise from the intermediate potential V1 to the potential V5 of the holding waveform element h at the time point t2 when the selection switch Sa is switched from the OFF-state to the ON-state. After the potential rises to the potential V5, the common drive waveform Vcom passes the selection switch Sa as it is without the trimming process.

Accordingly, as illustrated in FIG. 17C, the trimming waveform Vt becomes a waveform in which the start point of the contraction waveform element g of the non-discharge pulse Pb starts from the time point t2. Then, the trimming waveform Vt becomes the same shape as the common drive waveform Vcom after the time point t2.

Thus, the head controller (circuitry) is configured to control the selection switch Sa to switch from the ON state to the OFF-state at time point t1 before a start point of the contraction waveform element g, and switch from the OFF-state to the ON-state in a waveform portion of the holding waveform element h.

Here, the time point t2 is changed to change the timing, at which the pressure chamber 121 contracts by the non-discharge pulse Pb. The selection switch Sa is switched from the OFF-state to the ON-state at the time point t2 after the selection switch Sa is switched from the ON-state to the OFF-state at the time point t1. Thus, the timing (time point t2) at which the pressure chamber 121 contracts is changed to change the discharge characteristics.

Therefore, the timing (time point t2) is set so that the discharge characteristics of each nozzle 111 become the target characteristics, for example. That is, the selection switch Sa is switched from the OFF-state to the ON-state at the time point t2 at which the common drive waveform Vcom is changed from the non-passing state to the passing state to pass through the selection switch S a.

Further, a part of the contraction waveform element (rising waveform element of the potential) of the non-discharge pulse Pb (micro drive portion) is trimmed to control a state of the meniscus (shape of the meniscus or the like) to correct the shape of the discharge droplet to reduce a variation in the discharge deflection amount.

The head drive controller 400 according to the fourth embodiment does not trim the holding waveform element b of the discharge pulse Pa holding the most expanded state of the pressure chamber 121. Thus, the head drive controller 400 according to the fourth embodiment can reduce the variation in the discharge characteristics even for the head 100 having a short natural period.

Next, a trimming process performed by the head drive controller 400 according to a fifth embodiment of the present disclosure is described with reference to FIGS. 18A to 18C.

Figure 18A:
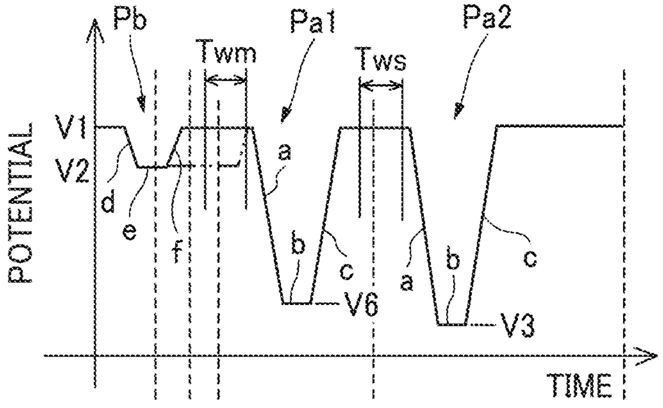
FIGS. 18A to 18C are graphs illustrating an example of a drive waveform, a state of the selection switch, and a trimming waveform (application waveform) to describe a trimming process in a fifth embodiment of the present disclosure.
Figure 18B:
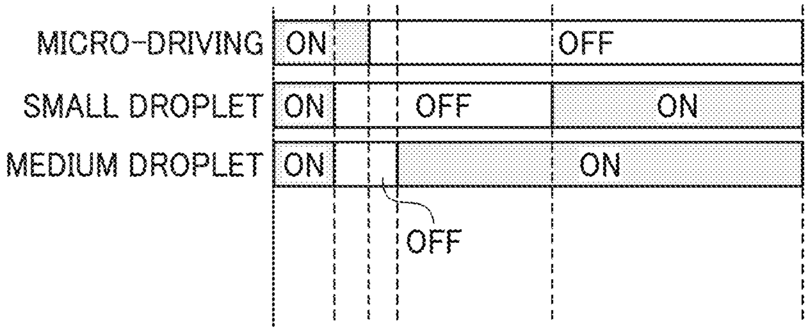
Figure 18C:
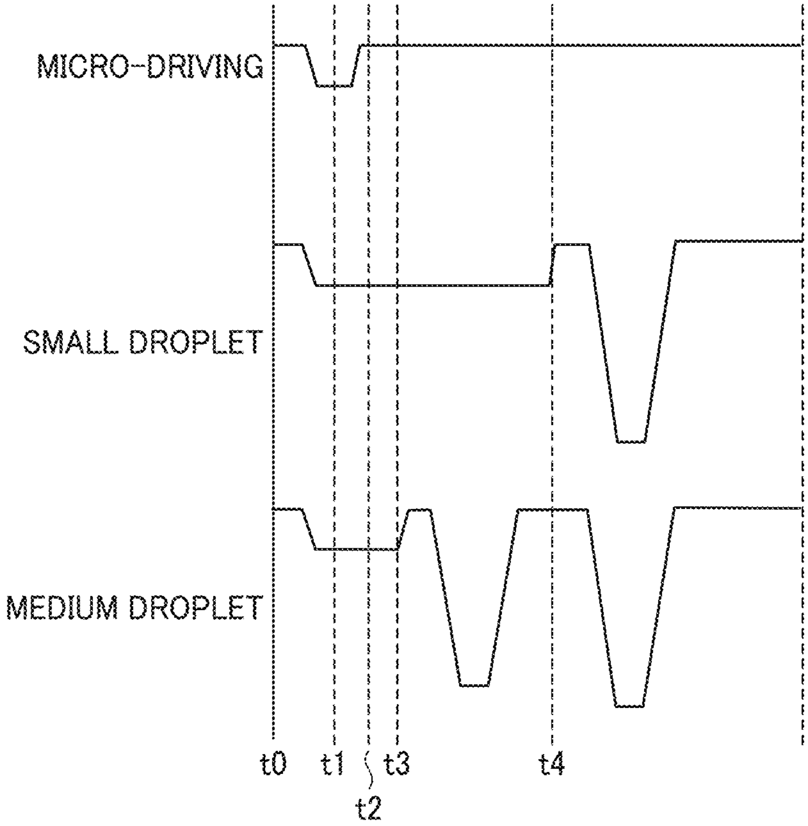

FIGS. 18A to 18C are graphs illustrating an example of a drive waveform, a state of the selection switch Sa, and the trimming waveform Vt according to the fifth embodiment.

The common drive waveform Vcom of the fifth embodiment includes a non-discharge pulse Pb, a discharge pulse Pa1, and a discharge pulse Pa2 in time series as illustrated in FIG. 18A. The discharge pulses Pa1 and Pa2 are discharge drive waveforms to pressurize the pressure chamber 121 and discharge a liquid from the nozzle 111. The non-discharge pulse Pb is a micro drive waveform (a non-discharge drive waveform) to pressurize the liquid in the nozzle 111 to the degree at which the liquid is not discharged from the nozzle 111 to vibrate a meniscus of the liquid in the nozzle 111.

Each of the discharge pulse Pa1 and Pa2 includes an expansion waveform element "a" for expanding the pressure chamber 121, a holding waveform element "b" for holding an expanded state of the pressure chamber 121 expanded by the expansion waveform element a, and a contraction waveform element "c" for contracting the pressure chamber 121 from the expanded state held by the holding waveform element b to discharge liquid.

The expansion waveform element a of the discharge pulse Pa1 is a waveform falling from the intermediate potential V1 (V1>V6) to a potential V6. The holding waveform element b holds the potential V6 that is a terminal potential of the expansion waveform element a. The contraction waveform element c rises from the potential V6 held by the holding waveform element b to the intermediate potential V1.

The expansion waveform element a of the discharge pulse Pa2 falls from the intermediate potential V1 to a potential V3 (V1>V6>V3). The holding waveform element b holds the potential V3 that is a terminal potential of the expansion waveform element a. The contraction waveform element c rises from the potential V3 held by the holding waveform element b to the intermediate potential V1. This discharge pulse Pa2 is the same as the discharge pulse Pa as described in each of the above-described embodiments.

The non-discharge pulse Pb includes an expansion waveform element "d" for expanding the pressure chamber 121, a holding waveform element "e" for holding an expanded state of the pressure chamber 121 expanded by the expansion waveform element d, and a contraction waveform element "f" for contracting the pressure chamber 121 from the expanded state held by the holding waveform element e.

The expansion waveform element d falls from the intermediate potential V1 to the potential V2 (V1>V2). The holding waveform element e holds the potential V2 that is a terminal potential of the expansion waveform element d. The contraction waveform element of rises from the potential V2 held by the holding waveform element e to the intermediate potential V1.

As illustrated in FIG. 18B, when the liquid is discharged from the nozzle 111, the selection switch Sa is controlled to be switched to the ON-state or the OFF-state to pass not only the discharge pulse Pa1 and the discharge pulse Pa2 (or the discharge pulse Pa2), but also a part of the waveform of the non-discharge pulse Pb in the fifth embodiment.

Here, the selection switch Sa is switched to the ON-state at a time point t0 before a start point of the expansion waveform element d of the non-discharge pulse Pb, and the selection switch Sa is switched from the ON-state to the OFF-state at a time point t2 after an end point of the contraction waveform element f to perform a simple micro driving.

Accordingly, as illustrated in FIG. 18C, the trimming waveform Vt becomes the same as the non-discharge pulse Pb.

The selection switch Sa is controlled to pass through a part of the discharge pulse Pa2 and a part of the non-discharge pulse Pb to discharge the small droplet.

The selection switch Sa becomes the ON-state at the time point t0 before the start point of the expansion waveform element d of the non-discharge pulse Pb, and the selection switch Sa is switched from the ON-state to the OFF-state at the time point t1 before the end point of the holding waveform element e. The selection switch Sa becomes the OFF-state so that the potential V2 held by the holding waveform element e of the non-discharge pulse Pb is maintained until the selection switch Sa becomes the ON-state. Then, the selection switch Sa is switched from the OFF-state to the ON-state at a time point t4 before the start point of the discharge pulse Pa2 and after an end point of the contraction waveform element c of the discharge pulse Pa1.

As a result, as illustrated in FIG. 18C, the trimming waveform Vt falls from the intermediate potential V1 to the potential V2 in accordance with the expansion waveform element d of the non-discharge pulse Pb, is held at the potential V2 until the time point t4, and rises to the potential V1 at the time point t4. Then, the trimming waveform Vt becomes the same as the common drive waveform Vcom after the time point t4. When a small droplet is discharged, a non-discharge pulse (micro drive waveform) is generated that falls to the potential V2 in accordance with the expansion waveform element d of the non-discharge pulse Pb, is held at the potential V2 until the time point t4, and rises to the potential V1 at the time point t4.

At this time (at a time of discharging the small droplet), the time point t4 is changed to change the timing, at which the pressure chamber 121 contracts by the non-discharge pulse Pb. The selection switch Sa is switched from the OFF-state to the ON-state at the time point t4. Thus, the timing (time point t4) at which the pressure chamber 121 contracts is changed to change a relation between a meniscus vibration and the discharge pulse Pa2 subsequently applied after the meniscus vibration to change the discharge characteristics.

Therefore, the timing (time point t4) is set within a trimming region Tws indicated in FIG. 18A so that the discharge characteristics of each nozzle 111 become the target characteristics, for example. That is, the selection switch Sa is switched from the OFF-state to the ON-state at the time point t4 at which the common drive waveform Vcom is changed from the non-passing state to the passing state to pass through the selection switch Sa.

Thus, the head drive controller 400 according to the first embodiment can apply the trimming waveform Vt corresponding to the correction amount (adjustment amount) for each nozzle 111 while maintaining the waveform length of the driving waveform. Further, the waveform is trimmed at a portion of the non-discharge pulse Pb (micro drive portion) of the common drive waveform Vcom so that the head drive controller 400 can correct the variation in the discharge characteristics even for the head 100 including the pressure chamber 121 having a short natural period. The natural period is also referred to as a "natural vibration period" or "resonance period".

The selection switch Sa is controlled to pass through a part of the discharge pulses Pa1 and Pa2 and a part of the non-discharge pulse Pb to discharge the medium droplet.

The selection switch Sa is switched to the ON-state at the time point t0 before the start point of the expansion waveform element d of the non-discharge pulse Pb, and the selection switch Sa is switched from the ON-state to the OFF-state at the time point t1 before the end point of the holding waveform element e. The selection switch Sa becomes the OFF-state so that the potential V2 held by the holding waveform element e of the non-discharge pulse Pb is maintained until the selection switch Sa becomes the ON-state. Then, the selection switch Sa is switched from the OFF-state to the ON-state at a time point t3 before the start point of the discharge pulse Pa1 and after an end point of the contraction waveform element f of the non-discharge pulse Pb.

As a result, as illustrated in FIG. 18C, the trimming waveform Vt of the medium droplet falls from the intermediate potential V1 to the potential V2 in accordance with the expansion waveform element d of the non-discharge pulse Pb, is held at the potential V2 until the time point t3, and rises to the potential V1 at the time point t3. Then, the trimming waveform Vt becomes the same as the common drive waveform Vcom after the time point t4. That is, when the middle droplet is to be discharged, the holding waveform element e of the non-discharge pulse Pb is maintained until the time point t3.

Here, the time point t3 is changed to change the timing, at which the pressure chamber 121 contracts by the non-discharge pulse Pb. The selection switch Sa is switched from the OFF-state to the ON-state at the time point t3 after the selection switch Sa is switched from the ON-state to the OFF-state at the time point t1. Thus, the timing (time point t3) at which the pressure chamber 121 contracts is changed to change the discharge characteristics.

Therefore, the timing (time point t3) is set within a trimming region Twm indicated in FIG. 18A so that the discharge characteristics of each nozzle 111 become the target characteristics, for example. That is, the selection switch Sa is switched from the OFF-state to the ON-state at the time point t3 at which the common drive waveform Vcom is changed from the non-passing state to the passing state to pass through the selection switch Sa.

Thus, the head drive controller 400 according to the fifth embodiment can apply the trimming waveform Vt corresponding to the correction amount (adjustment amount) for each nozzle 111 while maintaining the waveform length of the driving waveform. Further, the waveform is trimmed at a portion of the non-discharge pulse Pb (micro drive portion) of the common drive waveform Vcom so that the head drive controller 400 can correct the variation in the discharge characteristics even for the head 100 including the pressure chamber 121 having a short natural period. The natural period is also referred to as a "natural vibration period" or "resonance period".

Next, the head drive controller 400 according to a sixth embodiment of the present disclosure is described with reference to FIGS. 19A to 19C.

Figure 19A:
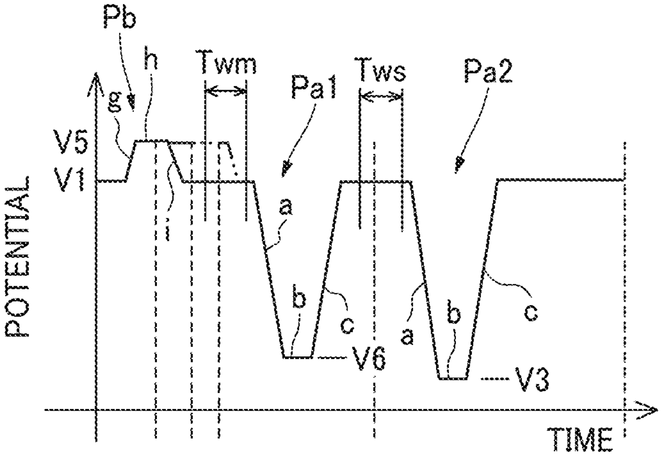
FIGS. 19A to 19C are graphs illustrating an example of a drive waveform, a state of the selection switch, and a trimming waveform (application waveform) to describe a trimming process in a sixth embodiment of the present disclosure.
Figure 19B:
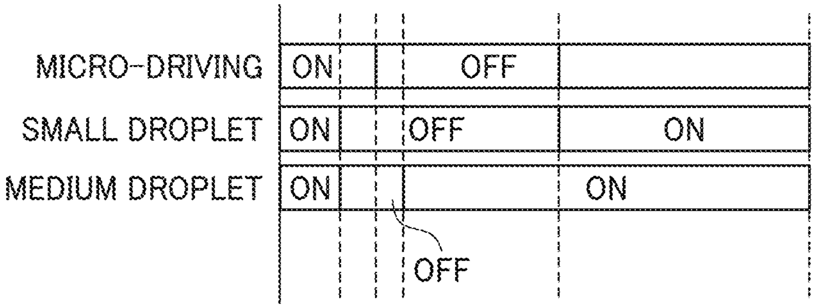
Figure 19C:
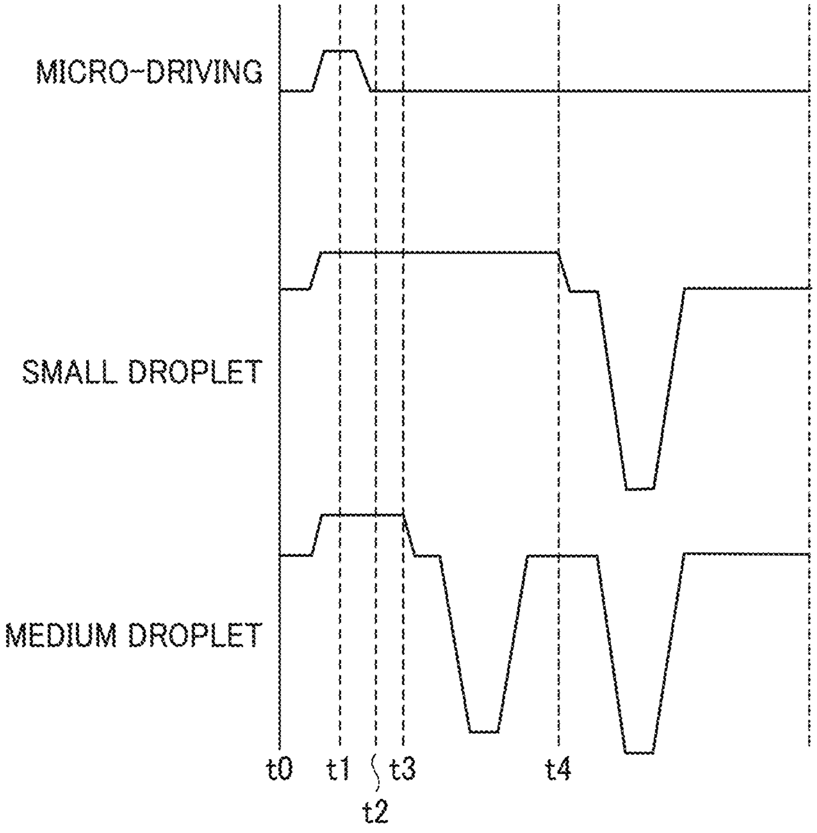

FIGS. 19A to 19C are graphs illustrating an example of a drive waveform, a state of the selection switch Sa, and the trimming waveform Vt according to the sixth embodiment.

The common drive waveform Vcom of the sixth embodiment includes a non-discharge pulse Pb, a discharge pulse Pa1, and a discharge pulse Pa2 in time series as illustrated in FIG. 19A. The discharge pulses Pa1 and Pa2 are discharge drive waveforms to pressurize the pressure chamber 121 and discharge a liquid from the nozzle 111. The non-discharge pulse Pb is a micro drive waveform (a non-discharge drive waveform) to pressurize the liquid in the pressure chamber 121 to the degree at which the liquid is not discharged from the nozzle 111 to vibrate a meniscus of the liquid in the nozzle 111.

Each of the discharge pulse Pa1 and Pa2 includes an expansion waveform element "a" for expanding the pressure chamber 121, a holding waveform element "b" for holding an expanded state of the pressure chamber 121 expanded by the expansion waveform element a, and a contraction waveform element "c" for contracting the pressure chamber 121 from the expanded state held by the holding waveform element b to discharge a liquid.

The expansion waveform element a of the discharge pulse Pa1 falls from the intermediate potential V1 to a potential V6 (V1>V6). The holding waveform element b of the discharge pulse Pa1 holds the potential V6 that is a terminal potential of the expansion waveform element a. The contraction waveform element c of the discharge pulse Pa1 rises from the potential V6 held by the holding waveform element b to the intermediate potential V1.

The expansion waveform element a of the discharge pulse Pa2 falls from the intermediate potential V1 to a potential V3 (V1>V6>V3). The holding waveform element b of the discharge pulse Pa2 holds the potential V3 that is a terminal potential of the expansion waveform element a. The contraction waveform element c of the discharge pulse Pa2 rises from the potential V3 held by the holding waveform element b to the intermediate potential V1. This discharge pulse Pa2 is the same as the discharge pulse Pa as described in each of the above-described embodiments.

The non-discharge pulse Pb includes a contraction waveform element "g" to contract the pressure chamber 121, a holding waveform element "h" to hold a contracted state of the pressure chamber 121 contracted by the contraction waveform element g, and an expansion waveform element "i" to expand the pressure chamber 121 from the contracted state held by the holding waveform element h.

The contraction waveform element g rises from the potential V1 to the potential V5 (V5>V1). The holding waveform element h holds the potential V5 that is a terminal potential of the contraction waveform element g. The expansion waveform element i falls from the potential V5 held by the holding waveform element h to the intermediate potential V1.

As illustrated in FIG. 19B, when the liquid is discharged from the nozzle 111, the selection switch Sa is controlled to be switched to the ON-state or the OFF-state to pass not only the discharge pulse Pa1 and the discharge pulse Pa2 (or the discharge pulse Pa2), but also a part of the waveform of the non-discharge pulse Pb in the sixth embodiment.

Here, the selection switch Sa is switched to the ON-state at a time point t0 before a start point of the contraction waveform element g of the non-discharge pulse Pb, and the selection switch Sa is switched from the ON-state to the OFF-state at a time point t2 after an end point of the expansion waveform element i to perform the simple micro driving.

Accordingly, as illustrated in FIG. 19C, the trimming waveform Vt becomes the same as the non-discharge pulse Pb.

The selection switch Sa is controlled to pass through a part of the discharge pulse Pa2 and a part of the non-discharge pulse Pb to discharge the small droplet.

The selection switch Sa is switched to the ON-state at the time point t0 before the start point of the contraction waveform element g of the non-discharge pulse Pb, and the selection switch Sa is switched from the ON-state to the OFF-state at the time point t1 before the end point of the holding waveform element h. The selection switch Sa becomes the OFF-state so that the potential V5 held by the holding waveform element h of the non-discharge pulse Pb is maintained until the selection switch Sa becomes the ON-state. Then, the selection switch Sa is switched from the OFF-state to the ON-state at a time point t4 before the start point of the discharge pulse Pa2 and after an end point of the contraction waveform element c of the discharge pulse Pa1.

As a result, as illustrated in FIG. 19C, the trimming waveform Vt rises from the intermediate potential V1 to the potential V5 in accordance with the contraction waveform element g of the non-discharge pulse Pb, is held at the potential V5 until the time point t4, and rises to the potential V1 at the time point t4.

Then, the trimming waveform Vt becomes the same as the common drive waveform Vcom after the time point t4. When a small droplet is discharged, a non-discharge pulse (micro drive waveform) is generated that rises to the potential V5 in accordance with the expansion waveform element g of the non-discharge pulse Pb, is held at the potential V5 until the time point t4, and falls to the potential V1 at the time point t4.

At this time (at a time of discharging the small droplet), the time point t4 is changed to change the timing, at which the pressure chamber 121 expands by the non-discharge pulse Pb. The selection switch Sa is switched from the OFF-state to the ON-state at the time point t4. Thus, the timing (time point t4) at which the pressure chamber 121 expands is changed to change the discharge characteristics.

Therefore, the timing (time point t4) is set within a trimming region Tws indicated in FIG. 19A so that the discharge characteristics of each nozzle 111 become the target characteristics, for example. That is, the selection switch Sa is switched from the OFF-state to the ON-state at the time point t4 at which the common drive waveform Vcom is changed from the non-passing state to the passing state to pass through the selection switch Sa.

Thus, the head drive controller 400 according to the sixth embodiment can apply the trimming waveform Vt corresponding to the correction amount (adjustment amount) for each nozzle 111 while maintaining the waveform length of the driving waveform. Further, the waveform is trimmed at a portion of the non-discharge pulse Pb (micro drive portion) of the common drive waveform Vcom so that the head drive controller 400 can correct the variation in the discharge characteristics even for the head 100 including the pressure chamber 121 having a short natural period. The natural period is also referred to as a "natural vibration period" or "resonance period".

The selection switch Sa is controlled to pass through a part of the discharge pulses Pa1 and Pa2 and a part of the non-discharge pulse Pb to discharge the medium droplet.

The selection switch Sa is switched to the ON-state at the time point t0 before the start point of the expansion waveform element d of the non-discharge pulse Pb, and the selection switch Sa is switched from the ON-state to the OFF-state at the time point t1 before the end point of the holding waveform element h.

The selection switch Sa becomes the OFF-state so that the potential V5 held by the holding waveform element h of the non-discharge pulse Pb is maintained until the selection switch Sa becomes the ON-state. Then, the selection switch Sa is switched from the OFF-state to the ON-state at a time point t3 before the start point of the discharge pulse Pa1 and after an end point of the expansion waveform element i of the non-discharge pulse Pb.

As a result, as illustrated in FIG. 19C, the trimming waveform Vt of the medium droplet rises from the intermediate potential V1 to the potential V5 in accordance with the contraction waveform element g of the non-discharge pulse Pb, is held at the potential V5 until the time point t3, and falls to the potential V1 at the time point t3. That is, when the middle droplet is to be discharged, the holding waveform element h of the non-discharge pulse Pb is maintained until the time point t3.

Here, the time point t3 is changed to change the timing, at which the pressure chamber 121 expands by the non-discharge pulse Pb. The selection switch Sa is switched from the OFF-state to the ON-state at the time point t3 after the selection switch Sa is switched from the ON-state to the OFF-state at the time point t1. Thus, the timing (time point t3) at which the pressure chamber 121 expands is changed to change the discharge characteristics.

Therefore, the timing (time point t3) is set within a trimming region Twm indicated in FIG. 19A so that the discharge characteristics of each nozzle 111 become the target characteristics, for example. That is, the selection switch Sa is switched from the OFF-state to the ON-state at the time point t3 at which the common drive waveform Vcom is changed from the non-passing state to the passing state to pass through the selection switch Sa.

Thus, the head drive controller 400 according to the sixth embodiment can apply the trimming waveform Vt corresponding to the correction amount (adjustment amount) for each nozzle 111 while maintaining the waveform length of the driving waveform.

Further, the waveform is trimmed at a portion of the non-discharge pulse Pb (micro drive portion) of the common drive waveform Vcom so that the head drive controller 400 can correct the variation in the discharge characteristics even for the head 100 including the pressure chamber 121 having a short natural period. The natural period is also referred to as a "natural vibration period" or "resonance period".

Next, the head drive controller 400 according to a seventh embodiment of the present disclosure is described with reference to FIGS. 20A to 20C.

Figure 20A:
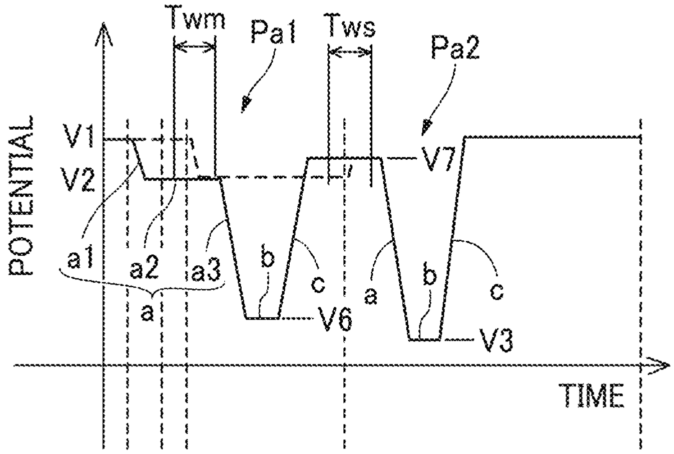
FIGS. 20A to 20C are graphs illustrating an example of a drive waveform, a state of the selection switch, and a trimming waveform (application waveform) to describe a trimming process in a seventh embodiment of the present disclosure.
Figure 20B:
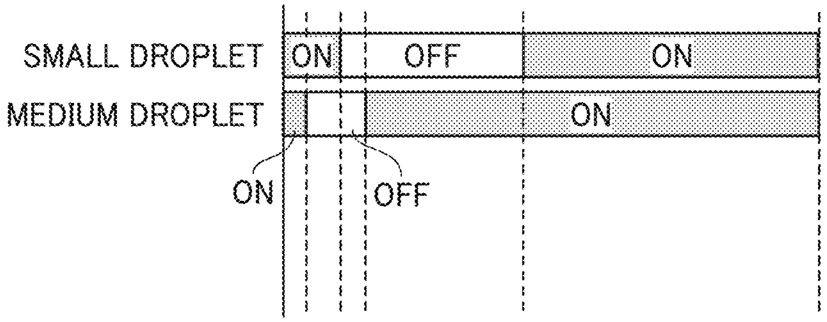
Figure 20C:
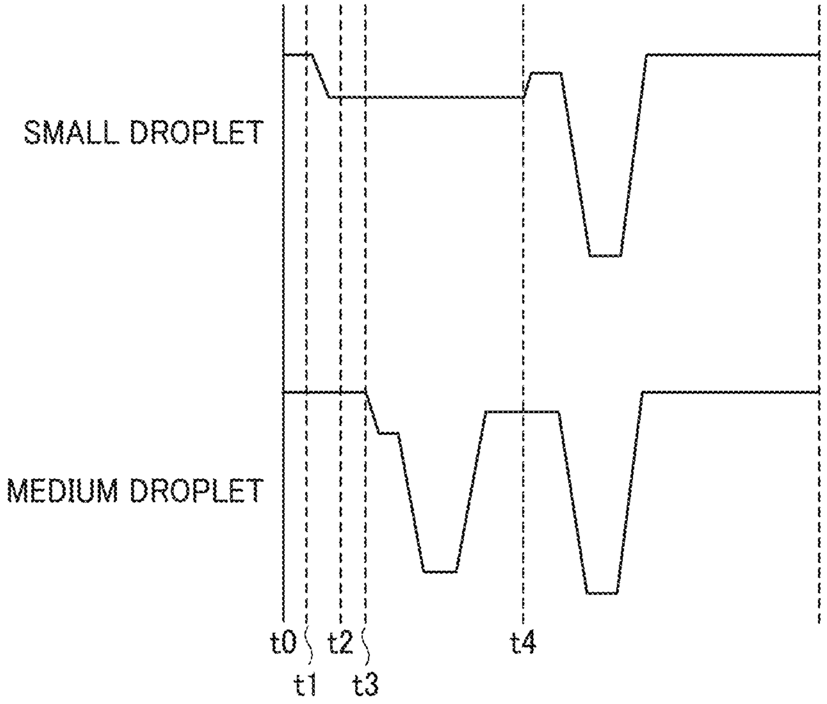

FIGS. 20A to 20C are graphs illustrating an example of a drive waveform, a state of the selection switch Sa, and the trimming waveform Vt according to the seventh embodiment.

The common drive waveform Vcom of the seventh embodiment includes a discharge pulse Pa1 and a discharge pulse Pa2 in time series as illustrated in FIG. 20A. The discharge pulses Pa1 and Pa2 are discharge drive waveforms to pressurize the pressure chamber 121 and discharge a liquid from the nozzle 111. The discharge pulse Pa1 is a first discharge pulse (preceding discharge pulse), and the discharge pulse Pa2 is a second discharge pulse (succeeding discharge pulse) in the seventh embodiment.

Each of the discharge pulse Pa1 and Pa2 includes an expansion waveform element "a" for expanding the pressure chamber 121, a holding waveform element "b" for holding an expanded state of the pressure chamber 121 expanded by the expansion waveform element a, and a contraction waveform element "c" for contracting the pressure chamber 121 from the expanded state held by the holding waveform element b to discharge a liquid.

In the seventh embodiment, the expansion waveform element a of the discharge pulse Pa1 is a waveform that expands the pressure chamber 121 in two or more stages. The expansion waveform element a of the discharge pulse Pa1 includes a first-stage expansion waveform element a1 for expanding the pressure chamber 121, a first-stage holding waveform element a2 for holding an expanded state of the pressure chamber 121 expanded by the first-stage expansion waveform element a1, and a second-stage expansion waveform element a3 for further expanding the pressure chamber 121 from the expanded state held by the first-stage holding waveform element a2.

The first-stage expansion waveform element a1 is an expansion waveform element of a first stage. The first-stage expansion waveform element a1 falls from the intermediate potential V1 to the potential V2 (V1>V2). The first-stage holding waveform element a2 holds the potential V2 that is a terminal potential of the first-stage expansion waveform element a1. The second-stage expansion waveform element a3 is an expansion waveform element of a second stage. The second-stage expansion waveform element a3 falls from the potential V2 to the potential V6 (V2>V6).

A falling potential V2 by the first-stage expansion waveform element a1 is substantially the same as (or similar to) a falling potential of the expansion waveform element a of the non-discharge pulse Pb described in each of the above embodiments. The falling potential V2 is a terminal potential of the first-stage expansion waveform element a1. When the potential rises from the potential V2, the pressure chamber 121 is merely pressurized to the degree at which the liquid is not discharged from the nozzle 111 since the first-stage expansion waveform element a1 may serve as the expansion waveform element a of the non-discharge pulse Pb.

The holding waveform element b holds the potential V6 that is a terminal potential of the second-stage expansion waveform element a3. The contraction waveform element c rises from the potential V6 held by the holding waveform element b to the potential V7 (V1>V7>V2).

The expansion waveform element a of the discharge pulse Pa2 is a waveform falling from the rising potential V7 of the contraction waveform element c of the discharge pulse Pa1 to the potential V3 (V7>V3). The holding waveform element b of the discharge pulse Pa2 holds the potential V3 that is a terminal potential of the expansion waveform element a. The contraction waveform element c of the discharge pulse Pa2 rises from the potential V3 held by the holding waveform element b to the intermediate potential V1.

The selection switch Sa is controlled to pass through a part of the discharge pulses Pa1 and a part of the discharge pulse Pa2 to discharge the small droplet as illustrated in FIG. 20B.

That is, the selection switch Sa is switched to the ON-state at a time point t0 before a start point of the first-stage expansion waveform element a1 of the discharge pulse Pa1, and the selection switch Sa is switched from the ON-state to the OFF-state at a middle of the first-stage holding waveform element a2. In other words, when the discharge pulse Pa2 as the second discharge pulse is selected, the selection switch Sa is switched to the OFF-state in the first-stage holding waveform element a2 that is a portion of the terminal potential of the first-stage expansion waveform element a1 of the discharge pulse Pa1 as the first discharge pulse.

That is, the selection switch Sa is switched from the ON-state to the OFF-state in a waveform portion of the first-stage holding waveform element a2 at the time point t2 after an end point of the first-stage expansion waveform element a1 and before a start point of the second-stage expansion waveform element a3 of the discharge pulse Pa1 as the first discharge pulse.

The selection switch Sa becomes the OFF-state so that the potential V2 held by the first-stage holding waveform element a2 of the discharge pulse Pa1 is maintained until the selection switch Sa becomes the ON-state. Then, the selection switch Sa is switched from the OFF-state to the ON-state at a time point t4 before the start point of the discharge pulse Pa2 and after an end point of the contraction waveform element c of the discharge pulse Pa1. In other words, the selection switch Sa is switched from the OFF-state to the ON-state at a time point after the end point of the contraction waveform element c of the discharge pulse Pa1 as the first discharge pulse.

As a result, as illustrated in FIG. 20C, the trimming waveform Vt of the small droplet falls from the intermediate potential V1 to the potential V2 in accordance with the first-stage expansion waveform element a1 of the discharge pulse Pa1, is held at the potential V2 until the time point t4, and rises to the potential V7 at the time point t4. Then, the trimming waveform Vt becomes the same as the common drive waveform Vcom after the time point t4. When a small droplet is discharged, a non-discharge pulse (micro drive waveform) is generated that falls to the potential V7 at the time point t4 using the first-stage expansion waveform element a1 of the discharge pulse Pa1.

At this time, the time point t4 is changed to change the timing, at which the pressure chamber 121 expands by the discharge pulse Pa2. The selection switch Sa is switched from the OFF-state to the ON-state at the time point t4. Thus, the timing (time point t4) at which the pressure chamber 121 expands is changed to change the discharge characteristics.

Therefore, the timing (time point t4) is set within a trimming region Tws indicated in FIG. 20A so that the discharge characteristics of each nozzle 111 become the target characteristics, for example. That is, the selection switch Sa is switched from the OFF-state to the ON-state at the time point t4 at which the common drive waveform Vcom is changed from the non-passing state to the passing state to pass through the selection switch Sa.

Thus, the head drive controller 400 according to the sixth embodiment can apply the trimming waveform Vt corresponding to the correction amount (adjustment amount) for each nozzle 111 while maintaining the waveform length of the driving waveform. Further, the waveform is trimmed at a portion of the non-discharge pulse Pb (micro drive portion) of the common drive waveform Vcom so that the head drive controller 400 can correct the variation in the discharge characteristics even for the head 100 including the pressure chamber 121 having a short natural period. The natural period is also referred to as a "natural vibration period" or "resonance period". As described above, the non-discharge pulse Pb (micro drive waveform) is generated by the first-stage expansion waveform element a1 of the discharge pulse Pa1.

The selection switch Sa is controlled to pass through the discharge pulses Pa1 and Pa2 to discharge the medium droplet as illustrated in FIG. 20B.

That is, the selection switch Sa is switched to the OFF-state at a time point t1 before a start point of the first-stage expansion waveform element a1 of the discharge pulse Pa1. In response to the selection switch Sa becoming the OFF-state, the potential of the piezoelectric element 140 is held at the intermediate potential V1.

Then, the selection switch Sa is switched from the OFF-state to the ON-state at a time point t3 before an end point of the first-stage holding waveform element a2 of the discharge pulse Pa1. The potential of the piezoelectric element 140 falls from the intermediate potential V1 to the potential V2 held by the first-stage holding waveform element a2 in response to the selection switch Sa becoming the ON-state.

As a result, as illustrated in FIG. 20C, the trimming waveform Vt of the medium droplet falls from the intermediate potential V1 to the potential V2 at the time point t3. Then, the trimming waveform Vt becomes the same as the common drive waveform Vcom after the time point t3.

Thus, the printer 1 (liquid discharge apparatus) includes the head 100 including the piezoelectric element 140, the pressure chamber 121, and the nozzle 111, the head 100 is configured to drive the piezoelectric element 140 to deform the pressure chamber 121 to discharge a liquid from the nozzle 111. The printer 1 (liquid discharge apparatus) includes a drive waveform generator 402 configured to generate a drive waveform to be applied to the piezoelectric element 140 of the head 100.

The drive waveform includes a first discharge pulse Pa1 including two or more expansion waveform elements a1 and a3 for expanding the pressure chamber 121 in two or more stages, a holding waveform element b for holding an expanded state of the pressure chamber 121 expanded by a last stage of the expansion waveform element a3, and a contraction waveform element c for contracting the pressure chamber 121 from the expanded state held by the holding waveform element b, the first discharge pulse Pa1 configured to drive the piezoelectric element 140 to discharge the liquid from the nozzle 111; and a second discharge pulse Pa2 applied to the piezoelectric element 140 after the first discharge pulse Pa1, the second discharge pulse Pa configured to drive the piezoelectric element 140 to discharge the liquid from the nozzle 111.

The printer 1 (liquid discharge apparatus) includes the selection switch Sa between the head 100 and the drive waveform generator 402, the selection switch Sa configured to be switched to an ON-state in which the drive waveform passes the selection switch Sa or to an OFF-state in which the drive waveform does not pass the selection switch Sa, and the head controller 401 (circuitry) configured to control the selection switch Sa to switch from the ON state to the OFF-state at a time point t1 after an end point of a first stage of the two or more expansion waveform elements a1 and a3 and before a start point of a second stage of the two or more expansion waveform elements a1 and a3 of the first discharge pulse Pa1, and switch from the OFF-state to the ON-state at a time point t2 after an end point of the contraction waveform element c of the first discharge pulse Pa1 and before a start point of the second discharge pulse Pa2.

Here, the time point t3 is changed to change the timing, at which the pressure chamber 121 expands by the waveform corresponding to the first-stage expansion waveform a1. The selection switch Sa is switched from the OFF-state to the ON-state at the time point t3 after the selection switch Sa is switched from the ON-state to the OFF-state at the time point t1. Thus, the timing (time point t3) at which the pressure chamber 121 expands is changed to change the discharge characteristics by the discharge pulse Pa1.

Therefore, the timing (time point t3) is set within a trimming region Twm indicated in FIG. 20A so that the discharge characteristics of each nozzle 111 become the target characteristics, for example. That is, the selection switch Sa is switched from the OFF-state to the ON-state at the time point t3 at which the common drive waveform Vcom is changed from the non-passing state to the passing state to pass through the selection switch Sa.

Thus, the head drive controller 400 according to the sixth embodiment can apply the trimming waveform Vt corresponding to the correction amount (adjustment amount) for each nozzle 111 while maintaining the waveform length of the driving waveform. Further, the waveform is trimmed at a portion of the non-discharge pulse Pb (micro drive portion) of the common drive waveform Vcom so that the head drive controller 400 can correct the variation in the discharge characteristics even for the head 100 including the pressure chamber 121 having a short natural period. The natural period is also referred to as a "natural vibration period" or "resonance period".

The head drive controller 400 according to the above-described embodiments can reduce variation in the discharge characteristics.

In the present embodiments, a "liquid" discharged from the head is not particularly limited as long as the liquid has a viscosity and surface tension of degrees dischargeable from the head. Preferably, the viscosity of the liquid is not greater than 30 mPa·s under ordinary temperature and ordinary pressure or by heating or cooling.

Examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as DNA, amino acid, protein, or calcium, or an edible material, such as a natural colorant.

Such a solution, a suspension, or an emulsion can be used for, e.g., inkjet ink, surface treatment solution, a liquid for forming components of electronic element or light-emitting element or a resist pattern of electronic circuit, or a material solution for three-dimensional fabrication.

Examples of an energy source to generate energy to discharge liquid include a piezoelectric actuator (a laminated piezoelectric element or a thin-film piezoelectric element), a thermal actuator that employs a thermoelectric conversion element, such as a heating resistor, and an electrostatic actuator including a diaphragm and opposed electrodes.

Examples of the "liquid discharge apparatus" include, not only apparatuses capable of discharging liquid to materials to which liquid can adhere, but also apparatuses to discharge a liquid toward gas or into a liquid.

The "liquid discharge apparatus" may include units to feed, convey, and eject the material on which liquid can adhere.

The liquid discharge apparatus may further include a pretreatment apparatus to coat a treatment liquid onto the material, and a post-treatment apparatus to coat a treatment liquid onto the material, onto which the liquid has been discharged.

The "liquid discharge apparatus" may be, for example, an image forming apparatus to form an image on a sheet by discharging ink, or a three-dimensional fabrication apparatus to discharge a fabrication liquid to a powder layer in which powder material is formed in layers to form a three-dimensional fabrication object.

The "liquid discharge apparatus" is not limited to an apparatus to discharge liquid to visualize meaningful images, such as letters or figures.

For example, the liquid discharge apparatus may be an apparatus to form arbitrary images, such as arbitrary patterns, or fabricate three-dimensional images.

The above-described term "material on which liquid can adhere" represents a material on which liquid is at least temporarily adhered, a material on which liquid is adhered and fixed, or a material into which liquid is adhered to permeate.

Examples of the "material on which liquid can adhere" include recording media, such as paper sheet, recording paper, recording sheet of paper, film, and cloth, electronic component, such as electronic substrate and piezoelectric element, and media, such as powder layer, organ model, and testing cell.

The "material on which liquid can adhere" includes any material on which liquid is adhered, unless particularly limited.

Examples of the "material on which liquid can adhere" include any materials on which liquid can adhere even temporarily, such as paper, thread, fiber, fabric, leather, metal, plastic, glass, wood, and ceramic.

The "liquid discharge apparatus" may be an apparatus to relatively move the head and a material on which liquid can adhere.

However, the liquid discharge apparatus is not limited to such an apparatus.

For example, the liquid discharge apparatus may be a serial head apparatus that moves the head or a line head apparatus that does not move the head.

Examples of the "liquid discharge apparatus" further include a treatment liquid coating apparatus to discharge a treatment liquid to a sheet to coat the treatment liquid on a sheet surface to reform the sheet surface, and an injection granulation apparatus in which a composition liquid including raw materials dispersed in a solution is injected through nozzles to granulate fine particles of the raw materials.

The terms "image formation", "recording", "printing", "image printing", and "fabricating" used herein may be used synonymously with each other.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments such as the head drive controller 400 and the head controller 401 may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A liquid discharge apparatus comprising:

a head including a piezoelectric element, a pressure chamber, and a nozzle, the head configured to drive the piezoelectric element to discharge a liquid from the nozzle;

a drive waveform generator configured to generate a drive waveform to be applied to the piezoelectric element of the head, the drive waveform comprising:

a non-discharge pulse configured to drive the piezoelectric element to a degree at which the liquid is not discharged from the nozzle; and a discharge pulse applied to the piezoelectric element after the non-discharge pulse, the discharge pulse configured to drive the piezoelectric element to discharge the liquid from the nozzle;

a switch between the head and the drive waveform generator, the switch configured to be switched to an ON-state in which the drive waveform passes the switch or to an OFF-state in which the drive waveform does not pass the switch; and circuitry configured to control the switch to switch to the ON-state or the OFF-state in a waveform portion of the non-discharge pulse, wherein the non-discharge pulse includes:

an expansion waveform element expanding the pressure chamber;

a contraction waveform element contracting the pressure chamber; and a holding waveform element to keep a volume of the pressure chamber between the expand waveform element and the contraction waveform element, wherein the circuitry is configured to control the switch to switch to the ON-state or the OFF state in the holding waveform element in the non-discharge pulse.

2. The liquid discharge apparatus according to claim 1, wherein the head further includes the pressure chamber communicating with the nozzle, and the non-discharge pulse includes:

an expansion waveform element to expand the pressure chamber;

a holding waveform element to hold an expanded state of the pressure chamber expanded by the expansion waveform element; and a contraction waveform element to contract the pressure chamber from the expanded state held by the holding waveform element, and the circuitry controls the switch to:

switch from the ON-state to the OFF-state in the holding waveform element; and switch from the OFF-state to the ON-state at a time point after an end point of the contraction waveform element and before a start point of the discharge pulse.

3. The liquid discharge apparatus according to claim 1, wherein the head further includes the pressure chamber communicating with the nozzle, and the non-discharge pulse includes:

a contraction waveform element to contract the pressure chamber;

a holding waveform element to hold a contracted state of the pressure chamber contracted by the contraction waveform element; and an expansion waveform element to expand the pressure chamber from the contracted state held by the holding waveform element, and the circuitry controls the switch to:

switch from the ON state to the OFF-state in the holding waveform element; and switch from the OFF-state to the ON-state at a time point after an end point of the expansion waveform element and before a start point of the discharge pulse.

4. The liquid discharge apparatus according to claim 1, wherein the head further includes the pressure chamber communicating with the nozzle, and the non-discharge pulse includes:

an expansion waveform element to expand the pressure chamber;

a holding waveform element to hold an expanded state of the pressure chamber expanded by the expansion waveform element; and a contraction waveform element to contract the pressure chamber from the expanded state held by the holding waveform element, and the circuitry controls the switch to:

switch from the ON-state to the OFF-state before a start point of the expansion waveform element; and switch from the OFF-state to the ON-state in the holding waveform element.

5. The liquid discharge apparatus according to claim 1, wherein the head further includes the pressure chamber communicating with the nozzle, and the non-discharge pulse includes:

a contraction waveform element to contract the pressure chamber;

a holding waveform element to hold a contracted state of the pressure chamber contracted by the contraction waveform element; and an expansion waveform element to expand the pressure chamber from the contracted state held by the holding waveform element, and the circuitry controls the switch to:

switch from the ON state to the OFF-state at a time point before a start point of the contraction waveform element; and switch from the OFF-state to the ON-state in the holding waveform element.

6. A liquid discharge apparatus comprising:

a head including a piezoelectric element, a pressure chamber, and a nozzle, the head configured to drive the piezoelectric element to deform the pressure chamber to discharge a liquid from the nozzle;

a drive waveform generator configured to generate a drive waveform to be applied to the piezoelectric element of the head, the drive waveform comprising:

a first discharge pulse configured to drive the piezoelectric element to discharge the liquid from the nozzle, the first discharge pulse including:

two or more expansion waveform elements to expand the pressure chamber in two or more stages;

a holding waveform element to hold an expanded state of the pressure chamber expanded by a last stage of the two or more expansion waveform element; and a contraction waveform element to contract the pressure chamber from the expanded state held by the holding waveform element; and a second discharge pulse applied to the piezoelectric element after the first discharge pulse, the second discharge pulse configured to drive the piezoelectric element to discharge the liquid from the nozzle;

a switch between the head and the drive waveform generator, the switch configured to be switched to an ON-state in which the drive waveform passes the switch or to an OFF-state in which the drive waveform does not pass the switch; and circuitry configured to control the switch to:

switch from the ON state to the OFF-state at a time point after an end point of a first stage of the two or more expansion waveform elements and before a start point of a second stage of the two or more expansion waveform elements of the first discharge pulse; and switch from the OFF-state to the ON-state at a time point after an end point of the contraction waveform element of the first discharge pulse and before a start point of the second discharge pulse.

7. The liquid discharge apparatus according to claim 6, wherein the first discharge pulse is a single pulse.

8. The liquid discharge apparatus according to claim 6, wherein the two or more expansion waveform elements are connected by first-stage holding waveform elements.

9. A head drive controller configured to drive a head to discharge a liquid, the head drive controller comprising:

a drive waveform generator configured to generate a drive waveform to be applied to the head, the drive waveform comprising:

a non-discharge pulse configured to drive the head to a degree at which the liquid is not discharged; and a discharge pulse applied to the head after the non-discharge pulse, the discharge pulse configured to drive the head to discharge the liquid;

a switch between the head and the drive waveform generator, the switch configured to be switched to an ON-state in which the drive waveform passes the switch or to an OFF-state in which the drive waveform does not pass the switch; and circuitry configured to control the switch to switch to the ON-state or the OFF-state in a waveform portion of the non-discharge pulse, wherein the non-discharge pulse includes:

an expansion waveform element expanding a pressure chamber;

a contraction waveform element contracting the pressure chamber; and a holding waveform element to keep a volume of the pressure chamber between the expand waveform element and the contraction waveform element, wherein the circuitry is configured to control the switch to switch to the ON-state or the OFF state in the holding waveform element in the non-discharge pulse.

* * * * *